(12) United States Patent
Mitsubori et al.

(10) Patent No.: US 7,283,267 B2
(45) Date of Patent: Oct. 16, 2007

(54) DATA PROCESSING DEVICE, DATA PROCESSING METHOD, AND DATA PROCESSING PROGRAM FOR RECOGNIZING CHARACTERS IN A URL

(75) Inventors: Toshiyuki Mitsubori, Osaka (JP); Yoko Fujiwara, Osaka (JP); Masahiro Ozawa, Osaka (JP); Takeo Katsuda, Osaka (JP)

(73) Assignee: Minolta Co., Ltd., Osaka (JP)

( * ) Notice: Subject to any disclaimer, the term of this patent is extended or adjusted under 35 U.S.C. 154(b) by 851 days.

(21) Appl. No.: 10/076,365

(22) Filed: Feb. 19, 2002

(65) Prior Publication Data

US 2002/0114002 A1    Aug. 22, 2002

(30) Foreign Application Priority Data

Feb. 19, 2001  (JP)  ............................. 2001-042471
Apr. 19, 2001  (JP)  ............................. 2001-121734
Jun. 22, 2001  (JP)  ............................. 2001-190303

(51) Int. Cl.
    G06F 3/12      (2006.01)
    G06K 15/00     (2006.01)
(52) U.S. Cl. ..................................... 358/1.15; 358/1.14
(58) Field of Classification Search ............... 358/1.15, 358/518, 1.13, 1.14, 1.18, 1.17, 1.1, 500, 358/539, 400, 403, 524; 235/462.15
See application file for complete search history.

(56) References Cited

U.S. PATENT DOCUMENTS 6,263,121 B1 * 7/2001 Melen et al. ............... 382/305
6,537,324 B1 * 3/2003 Tabata et al. ............... 715/513

FOREIGN PATENT DOCUMENTS

| JP | 10-283313    |   | 10/1998 |
|----|--------------|---|---------|
| JP | 10-301954    |   | 11/1998 |
| JP | 10-301954 A  |   | 11/1998 |
| JP | 10301954 A   | * | 11/1998 |
| JP | 2000-118085  |   | 4/2000  |
| JP | 2000-118085 A|   | 4/2000  |
| JP | 2000118085 A | * | 4/2000  |
| JP | 2000-194530  |   | 7/2000  |

* cited by examiner

*Primary Examiner*—Douglas Q. Tran
(74) *Attorney, Agent, or Firm*—Morrison & Foerster, LLP

(57) ABSTRACT

The digital copying machine (11) obtains an image data by reading a document, applies a character recognition process on its URL, and transmits an HTML file transfer request to the Web server (20) corresponding to said URL. If it receives an HTML file from the Web server (20), it generates the image data of the Web page from said HTML file and outputs the image data; if it fails to receive an HTML file from the Web server (20), it outputs the document image data. It compares the document image data with the Web image data. It outputs the Web image data if the images match; it outputs an image specified by the user, if the images do not match. It applies a character recognition process on the printing date, and retrieves from the hard disk the HTML file related to said URL received later than said printing date. It generates an image data for the Web page identified by the detected HTML file and outputs it, if it succeeds in detecting said HTML; it receives a new HTML file from the Web server (20) of said URL, generates an image data, and outputs it, if it fails to detect said HTML file.

38 Claims, 20 Drawing Sheets

61

THE PAGE IS MISSING.

THE PAGE BEING SEARCHED MAY HAVE BEEN DELETED, HAVE A NEW NAME, OR BE CURRENTLY INACCESSIBLE.

http://www.xxx.xx.jp/

THE DOCUMENT ON THE DOCUMENT TABLE IS BEING COPIED...

THE PAGE IS MISSING.
THE PAGE BEING SEARCHED MAY HAVE BEEN DELETED, HAVE A NEW NAME, OR BE CURRENTLY INACCESSIBLE.

http://www.xxx.xx.jp/

RECONNECT AFTER CORRECTING URL    COPY DOCUMENT

FIG. 7

63 http://www.☒xx.xx.jp/

| A | B | C | D | E | F | G | H | I | J | K | L | M | N |
| O | P | Q | R | S | T | U | V | W | X | Y | Z |
| @ | . | / | : | _ | " | ! | # | $ | % | & | ' |

RECONNECT

CANCEL

IMAGES DO NOT MATCH.
PLEASE SELECT THE IMAGE
TO BE OUTPUTTED.

( DOCUMENT )   ( WEB PAGE )

FIG. 17

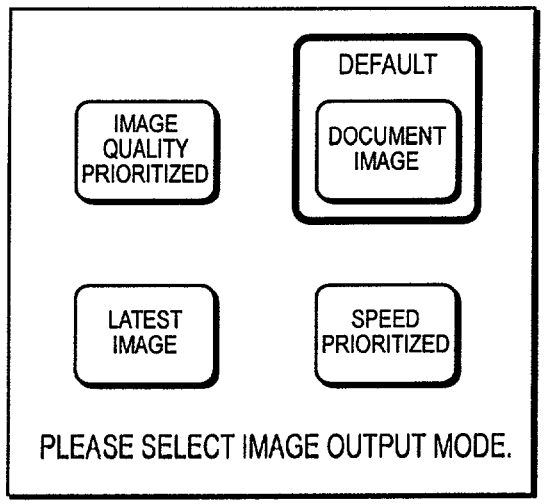

FIG. 19

| FILE NAME | URL | STORAGE DIRECTORY | DATE OF RECEIPT |
|---|---|---|---|
| File1.htm | http://www.aaa.co.jp/abc.html | c:¥web_page¥file1.htm | 2001/01/14 |
| File2.htm | http://www.iii.co.jp/home.html | c:¥web_page¥file2.htm | 2001/02/10 |
| File3.htm | http://www.uuu.co.jp/index.html | c:¥web_page¥file3.htm | 2001/02/28 |
| File4.htm | http://www.eee.co.jp/test.htm | c:¥web_page¥file4.htm | 2001/03/01 |
| File5.htm | http://www.ooo.xxx.com/test.htm | c:¥web_page¥file5.htm | 2001/03/01 |
| File6.htm | http://www.kakaka.co.jp/gaga.html | c:¥web_page¥file6.htm | 2001/03/05 |
| File7.htm | http://www.kikiki.co.jp/device.html | c:¥web_page¥file7.htm | 2001/04/11 |
| File8.htm | http://www.kukuku.co.jp/device.html | c:¥web_page¥file8.htm | 2001/04/11 |
| File9.htm | http://www.kekeke.co.jp/device.html | c:¥web_page¥file9.htm | 2001/04/18 |
| File10.htm | http://www.kokoko.com/semiconductors/ | c:¥web_page¥file10.htm | 2001/04/25 |

| FIG. 18A |
| FIG. 18B |

DATA PROCESSING DEVICE, DATA PROCESSING METHOD, AND DATA PROCESSING PROGRAM FOR RECOGNIZING CHARACTERS IN A URL

This application is based on Japanese Patent Application No. 2001-42471 filed on Feb. 19, 2001, Japanese Patent Application No. 2001-121734 filed on Apr. 19, 2001 and Japanese Patent Application No. 2001-190303 filed on Jun. 22, 2001, the contents of which are hereby incorporated by reference.

BACKGROUND OF THE INVENTION

1. Field of the Invention

The invention relates to an image-processing device for recognizing characters of a URL (Uniform Resource Locator) obtained by reading a printout of a Web page and generating the image data of the Web page to be outputted by connecting to its Web server.

2. Description of Related Art

As the use of personal computers have becomes popular and the number of users of the Internet has increased in recent years, the chance of printing Web pages as well as the chance of copying Web page printouts have increased due to the fact that the information exchange by means of printed media is still very popular. Unfortunately, however, the image quality deterioration produced as a result of copying Web page printouts tends to be conspicuous due to the fact that Web pages are normally designed as color pages. Therefore, various image-processing devices have been proposed (JP-A-10-283313 and others) for obtaining printouts of Web pages based on the images with least quality deteriorations using various methods of reading the URL recorded on the document footer and elsewhere by character recognition, obtaining the HTML file by accessing the Web server identified by the URL, generating the image data of the Web page, and printing it out.

However, those proposals have a universal shortcoming that they fail to consider and consequently cannot cope with a situation where connection cannot be made with an intended Web server due to reasons such as URL recognition errors, relocation or deletion of Web pages, congestions or operation interruptions of Web servers, etc.

Moreover, even if the HTML file is obtained by accessing the Web server, these proposals may still end up producing Web page image data different from the document due to reasons such as updates of the Web page.

Moreover, the user may not always want a newly downloaded image from the intended Web page, but rather want the quickest way of outputting while maintaining the needed picture quality, or the best image quality while preferring the fastest outputting speed. Moreover, the user may wish to obtain high quality printouts by image downloading only in cases where fainting of thin lines and smearing of characters are expected to occur when the documents produced by the N-in-1 method, i.e., printing the reduced images of multiple Web pages into one page, are copied. Furthermore, the user may wish to obtain outputs in color by downloading from Web pages, if the output device is capable of color printing, while existing documents are available only in monochromatic, as they can only result in monochromatic copies. The abovementioned image processing devices cannot cope with those requests by the user as well.

The present invention is made to address the abovementioned problems of the prior art, and one objective of the invention to provide an image-processing device capable of outputting a document image data automatically when the image processing device, which normally generates and outputs Web page image data by reading a Web page printout, recognizing characters of its URL, and connecting to a Web server, fails to be connected with the Web server for a certain reason.

Another objective of the present invention is to provide an image-processing device capable of outputting an intended image data by specifying a proper image data when a Web page image read from a document is different from a generated Web page image.

Yet another objective of the present invention is to provide an image-processing device capable of outputting an intended image data by properly selecting it between a document image data and a downloaded Web page image data based on the user's requirement prioritizing either quality or speed.

another objective of the present invention is to provide an image-processing device capable of outputting a high quality Web page image without any smeared characters by using downloaded Web page image data only when the particular document is an N-in-1 document.

Yet another objective of the present invention is to provide an image-processing device capable of outputting in color even if a provided document is a monochromatic document by means of using a downloaded Web page image data only when the provided document is a monochromatic document and the output device is capable of outputting in color.

SUMMARY OF THE INVENTION

The abovementioned objectives can be accomplished by the following means:

(1) A data processing device connected to a server computer via a network comprising:

an image reader for obtaining a image data by scanning a document image, wherein the document is printed based on a file published on the network by the server computer;

an extracting means for extracting location information that indicates the location of the file from the image data;

a transfer requesting means for requesting the server computer to transfer the file based on the location information extracted by the extracting means;

a receiving means for receiving a file transferred by the server computer; and a transmitting means for transmitting the image data to a specific destination if it fails to obtain the file from the server computer based on the location information.

(2) A data processing method executed on a data processing device connected to a server computer via a network comprising steps of:

obtaining a image data by scanning a document image, wherein the document is printed based on a file published on the network by the server computer;

extracting location information that indicates the location of the file from the image data;

requesting the server computer to transfer the file based on the location information extracted by the extracting means;

receiving a file transferred by the server computer; and transmitting the image data to a specific destination if it fails to obtain the file from the server computer based on the location information.

(3) A data processing program for causing a computer to execute every step described above.

(4) A data processing device connected to a server computer via a network comprising:

an image reader for obtaining a first image data by scanning a document image, wherein the document is printed based on a file published on the network by the server computer;

an extracting means for extracting location information that indicates the location of the file from the first image data;

a transfer requesting means for requesting the server computer to transfer the file based on the location information extracted by the extracting means;

a receiving means for receiving a file transferred by the server computer;

a data generating means for generating a second image data based on the file received by the receiving means;

a judging means for judging whether the second image data agrees with the first image data; and a notifying means for notifying the user of the fact of the disagreement if it is judged by the judging means that the second image data does not agree with the first image data.

(5) A data processing device connected to a server computer via a network comprising:

an image reader for obtaining a first image data by scanning a document image, wherein the document is printed based on a file published on the network by the server computer;

a first extracting means for extracting location information that indicates the location of the file from the first image data;

a second extracting means for extracting printing date that indicates the date when the document was printed from the first image data;

a receiving means for receiving a file transferred by the server computer;

a storage device for storing the file received by the receiving means;

a file retrieving means for retrieving a file that has the same location information as the location information extracted from the first image data and was received later than the printing date extracted from the first image data; and a data generating means for generating a second image data based on the file retrieved by the file retrieving means.

(6) A data processing device connected to a server computer via a network comprising:

an image reader for obtaining a first image data by scanning a document image, wherein the document is printed based on a file published on the network by the server computer;

a first extracting means for extracting location information that indicates the location of the file from the first image data;

a second extracting means for extracting printing date that indicates the date when the document was printed from the first image data;

a receiving means for receiving a file transferred by the server computer;

a storage device for storing the file received by the receiving means;

a file retrieving means for retrieving a file that has the same location information as the location information extracted from the first image data and was received later than the printing date extracted from the first image data;

a transfer requesting means for requesting the server computer to transfer the file based on the location information extracted by the first extracting means;

a mode receiving means for receiving an instruction specifying either an image quality prioritizing mode or a speed prioritizing mode;

a data generating means for generating a second image data based on the file retrieved by the file retrieving means and further generating a third image data based on the file transferred by the server computer in accordance with the file transfer request by the transfer requesting means;

a first transmitting means for transmitting, in the image quality prioritizing mode, the second image data to a specific destination if the file retrieval means succeeds in retrieving the file, while transmitting the third image data to the specific destination if the file retrieval means fails to retrieve the file; and a second transmitting means for transmitting, in the speed prioritizing mode, the second image data to the specific destination if the file retrieval means succeeds in retrieving the file, while transmitting the first image data to the specific destination if the file retrieval means fails to retrieve the file.

(7) A data processing device connected to a server computer via a network comprising:

an image reader for obtaining a first image data by scanning a document image wherein the document is printed based on a file published on the network by the server computer;

an extracting means for extracting location information that indicates the location of the file from the first image data;

a transfer requesting means for requesting the server computer to transfer the file based on the location information extracted by the first extracting means;

a receiving means for receiving a file transferred by the server computer;

a data generating means for generating a second image data based on the file received by the receiving means;

a judging means for judging whether the document image is a reduced image consisting of multiple pages of the document based on the first image data; and a transmitting means for transmitting the second image data to a specific destination if it is judged by the judging means that the document image data is a reduced image consisting of multiple pages of the document, while transmitting the first image data to the specific destination if it is judged that the document image data is not a reduced image consisting of multiple pages of the document.

(8) A data processing device connected to a server computer via a network comprising:

an image reader for obtaining a first image data by scanning a document image, wherein the document is printed based on a file published on the network by the server computer;

an extracting means for extracting location information that indicates the location of the file from the first image data;

a transfer requesting means for requesting the server computer to transfer the file based on the location information extracted by the first extracting means;

a receiving means for receiving a file transferred by the server computer;

a data generating means for generating a second image data based on the file received by the receiving means;

a judging means for judging whether the document image data is a color or monochromatic image based on the first image data; and a transmitting means for transmitting the first image data to a specific destination if it is judged by the judging means that the document image data is a color image, while transmitting the second image data to a specific destination if it is judged that the document image data is a monochromatic image.

BRIEF DESCRIPTION OF THE DRAWINGS

FIG. 6 is a diagram showing another example error message screen to be displayed on the operating panel unit 115 of the digital copying machine 11 when it fails to receive an HTML file from the Web server 2.

FIG. 7 is a diagram showing an example URL correction screen to be displayed on the operating panel unit 115 of the digital copying machine 11 when it is necessary to correct an URL error.

FIG. 12 is a diagram showing an example error message screen to be displayed on the operating panel unit 125 of the scanner according to the third embodiment when the document image fails to match with the Web page image.

FIG. 17 is a diagram showing an example input screen for setting up the image data output mode to be displayed on the operating panel unit 125 of the scanner according to the fifth embodiment.

FIG. 19 is a diagram showing an example HTML file reception list for the scanner according to the fifth embodiment.

DESCRIPTION OF THE PREFERRED EMBODIMENTS

Detailed descriptions of various embodiments of the present invention will be presented below referring to the accompanying drawings.

Figure 1:
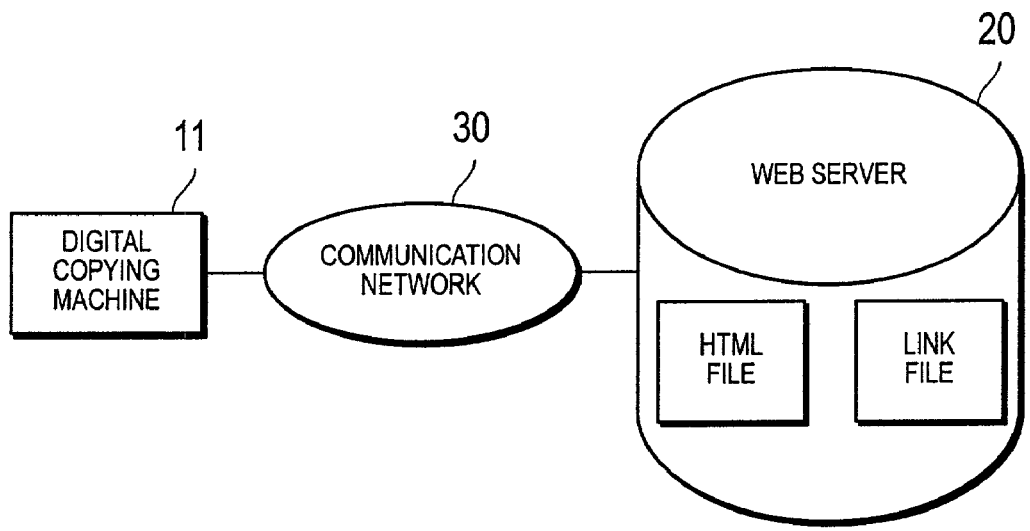
FIG. 1 is a block diagram showing the entire constitution of an image processing system including the digital copying machine 11 according to the first embodiment of the present invention.

FIG. 1 is a block diagram showing the entire constitution of an image processing system including an image-processing device according to the first embodiment of the present invention. The image processing system has a digital copying machine 11 that serves as the image processing device and a Web server 20, which are connected to each other via a communication network 30.

Figure 2:
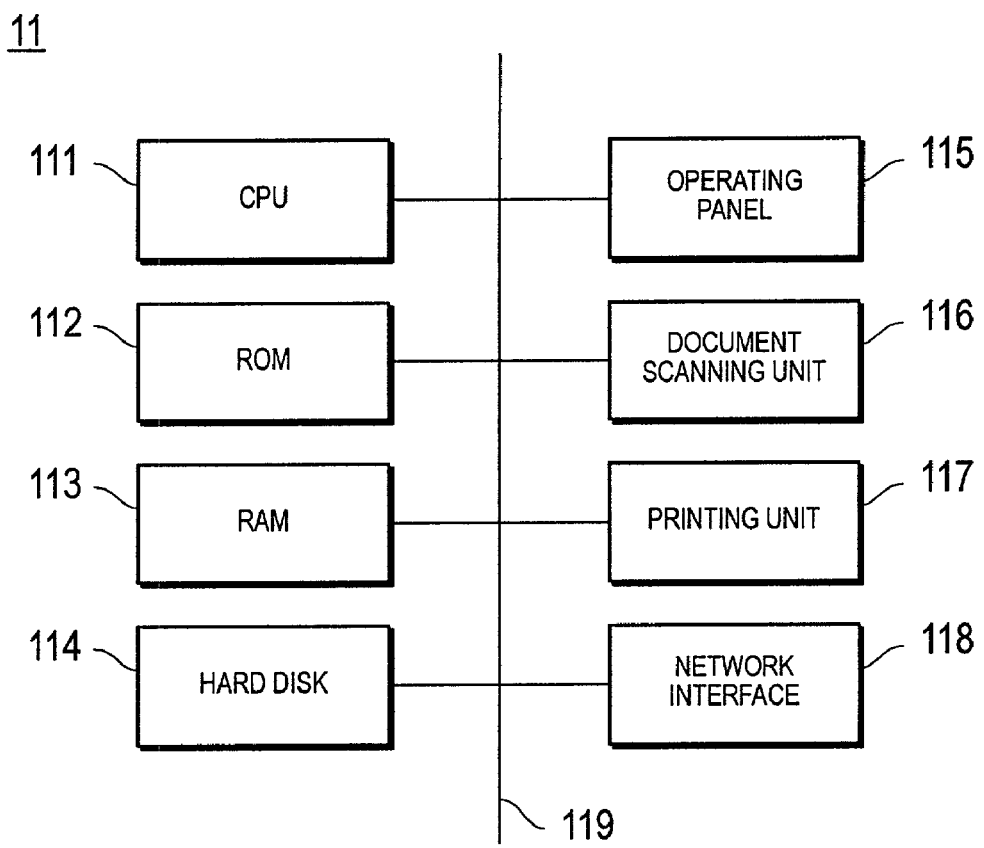
FIG. 2 is a block diagram showing the constitution of the digital copying machine 11.

FIG. 2 is a block diagram showing the constitution of the digital copying machine 11 according to this embodiment. In FIG. 2, the digital copying machine 11 is equipped with a CPU 111, a ROM 112, a RAM 113, a hard disk 114, an operating panel unit 115, a document-scanning unit 116, a printing unit 117 and a network interface 118, all of which are interconnected via a bus 119 provided for exchanging signals.

The CPU 111 is in charge of providing arithmetic operations and controls for various units mentioned above according to programs. The ROM 112 stores various programs and parameters. The RAM 113 is a working area provided for temporarily storing various programs and parameters. The hard disk 114 is used for temporarily storing various programs and parameters as well as to store image data obtained by image processing, etc. The digital copying machine 11 performs specific operations to be discussed later in this embodiment, and the program for controlling the digital copying machine 11 for this purpose is stored in the ROM 112 or the hard disk 114.

The operating panel unit 115 is equipped with a liquid crystal touch panel for displaying various information, a ten-key set for setting up the number of copies to be made, a start key for instructing the start of the operation, a stop key for instructing the stoppage of the operation, a reset key for initializing various setup conditions, etc. The document-scanning unit 116 generates image data (bit-map data) from electrical signals obtained by casting fluorescent light, etc., on the document placed on the specified scanning position and converting the reflecting light into electrical signals by means of photo detectors such as CCD and CIS. The document-scanning unit 116 is equipped with an automatic document feeder (ADF), so that it can scan multiple sheets of documents automatically by transporting each sheet to the specified scanning position by means of the ADF.

The printing unit 117 prints the image data after image processing according to the setup condition. The network interface 118 is an interface connected to the network and is used for communicating with other equipment on the network and operates according to standards such as the Ethernet®, TokenRing, and FDDI.

The Web server 20 is a computer having a WWW server function. The Web server 20 causes a document file of the HTML format laid open on the network as a WWW database and provides a function of transferring the HTML file in accordance with the client's request.

The communication network 30 includes a public network such as a telephone network, ISDN, and a packet exchange network, or a computer network such as LAN, WAN and the Internet.

Figure 3:
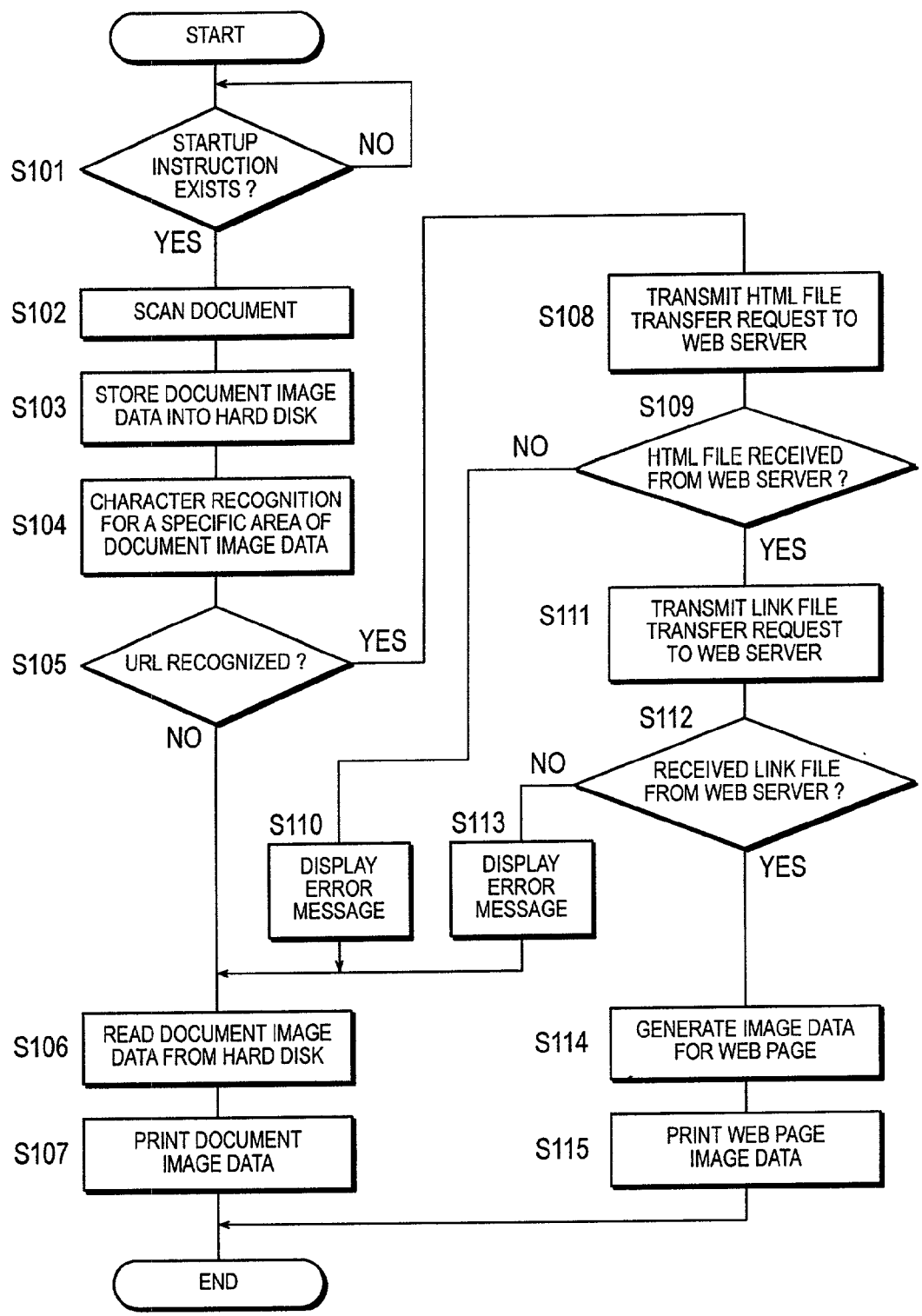
FIG. 3 is a flowchart showing the steps of image processing for the digital copying machine 11.

FIG. 3 is a flow chart showing the steps of image processing of the digital copying machine 11 according to the present embodiment. The digital copying machine 11 stands by until it receives the user's startup instruction (S101). The user sets a document, on which a Web page is printed, to a specified position of the document table, sets up the copying conditions such as the number of copies to be made, paper size, scaling ratio, density, layout (such as the N-in-1 function for laying out image data for N pages into output data for one page), single/double side copy, sorting, and finishing function (stapling, folding, punching functions, etc.) from the operating panel 115, and presses the startup key.

Upon receiving the startup instruction from the user (S101: Yes), the digital copying machine 11 obtains the image data by scanning the document (S102), and stores the obtained document image data to the hard disk 114 (S103).

Figures 4, 5:
FIG. 4 is a diagram showing an example printout of a Web page.
FIG. 5 is a diagram showing an example error message screen to be displayed on the operating panel unit 115 of the digital copying machine 11 when it fails to receive an HTML file from the Web server 2.

Next, the character recognition process is performed on the specified area of the document image data (S104). FIG. 4 shows an example of a document on which a Web page is printed. A document 51 obtained by printing a Web page has a specific area other than a text area 511, which consists of texts and graphics, for example, a header or a footer area, where the URL (Uniform Resource Locator) 512 for the Web page is printed. In such a case, the efficiency of the character recognition process can be improved, as the character recognition process is concentrated on such area of the document image data, where the URL 512 is displayed. Character recognition can be done using a method of identifying characters based on the degree of matching between the characteristic data of each character image and the dictionary pattern stored in advance.

If said character recognition process fails to recognize the URL (S105: No), the document image data stored in the hard disk 114 in the step S103 is read out to the RAM 113 (S106), and the document image data is printed according to the setup condition by the printing unit 117 (S107). On the other hand, if said character recognition process recognizes the URL (S105: Yes),the HTML file transfer request is transmitted via the network interface 118 and the communication network to the Web server 20 specified by the recognized URL (S108).

If it fails to receive the HTML file from the Web server 20 within a certain time period after transmitting the HTML file transfer request due to certain reasons, for example, misconnection due to errors in the URL character recognition, deletion or relocation of the Web page, congestions or operation interruptions of the Web server, etc., (S109: No), an error message screen 61 as shown in FIG. 5 is displayed on the operating panel unit 115 (110), the document image data stored in the hard disk 114 in the step S103 is read to the RAM 113 (S106), and the document image data is printed according to the setup condition by the printing unit 117 (S107).

In addition, it is also possible to adopt a constitution wherein "Reconnect after correcting URL" and "Document copy" buttons are provided on the error message screen 62 displayed on the operating panel unit 115 as shown in FIG. 6 in the error message display step S110, so that the user can select either to try to correct the URL and reconnect with the Web server 20, or to output the document copy, when it fails to connect with the Web server 20 due to an URL recognition failure in the character recognition step S104. In this case, the user checks the URL displayed on the screen, presses the "Reconnect after correcting URL" button if there is an error in the URL, corrects the URL in the URL correction screen 63 displayed as shown in FIG. 7, and instructs the controller to reconnect.

If the HTML file is received from the Web server 20 within a certain time period after the HTML file transfer request is transmitted (S109: Yes), the received HTML file is analyzed and a transfer request for link files such as an image file is transmitted to the Web server via the network interface 118 and the communication network (S111). If no link file is received from the Web server 2 within a certain period of time after the link file transfer request is issued due to reasons such as access congestion to the Web server (S112: No), an error message such as "Link file cannot be found" is displayed on the operating panel unit 115 (S113), and the document image data stored in the hard disk 114 in the step S103 is read to the RAM 113 (S106), and the document image data is printed according to the setup condition by the printing unit 117 (S107).

If a link file is received from the Web server 2 within a certain period of time after the HTML file transfer request is issued (S112: Yes), a Web page image data is generated based on the received HTML file and link file (S114), and the Web page image data is printed out by the printing unit 117 according to the setup condition (S115).

Figure 8:
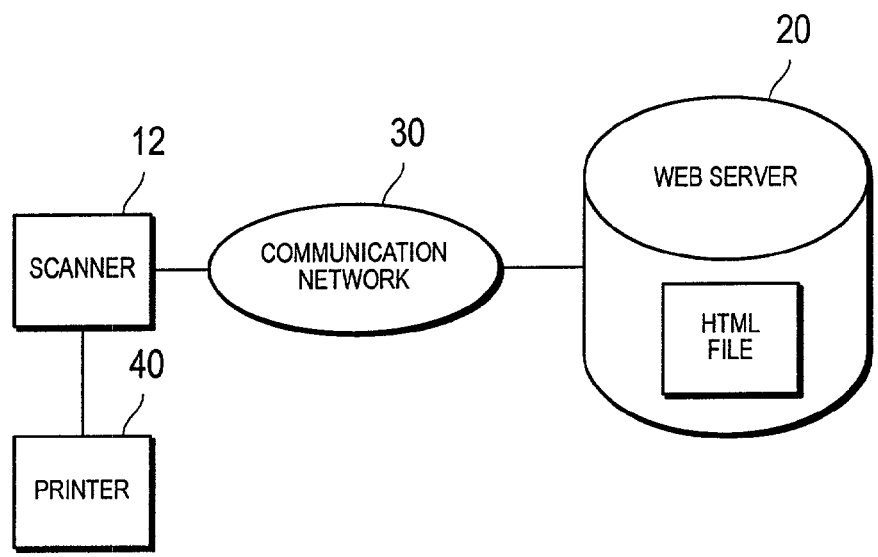
FIG. 8 is a block diagram showing the entire constitution of an image processing system including the scanner 12 according to the second embodiment of the present invention.

FIG. 8 is a block diagram showing the entire constitution of the image-processing system including the image-processing device according to the second embodiment of the present invention. This image-processing system consists of a scanner 12, which functions as the image-processing device, and the Web server 20, both of which are interlinked with the communication network 30. The scanner 12 is connected to a printer 40 via a local interface.

Figure 9:
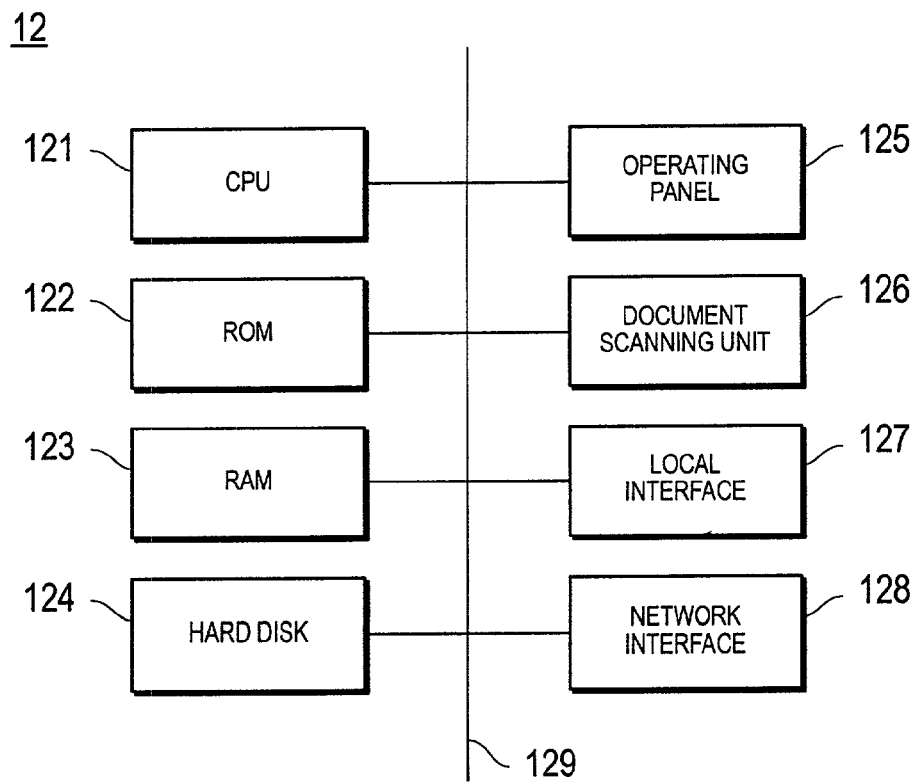
FIG. 9 is a block diagram showing the constitution of the scanner 12.

FIG. 9 is a block diagram showing the constitution of the scanner 12 according to this embodiment. FIG. 9 shows that the scanner 12 includes a CPU 121, a ROM 122, a RAM 123, a hard disk 124, an operating panel unit 125, a document scanning unit 126, a network interface 128, and a bus 129, all of which have identical functions as the corresponding units used in the digital copying machine 11 according to the first embodiment. The scanner 12 of this embodiment is also equipped with a local interface 127. The local interface 127 is an interface for the scanner to communicate with other equipment such as printers and personal computers without recourse to a network, and it can be either a serial interface such as USB and IEEE 1394, a parallel interface such as SCSI, or a wireless communication interface such as Bluetooth, IEEE 802.11, HomeRF, and IrDA.

The printer 40 provides printing output of printing images (bitmap data).

Figure 10:
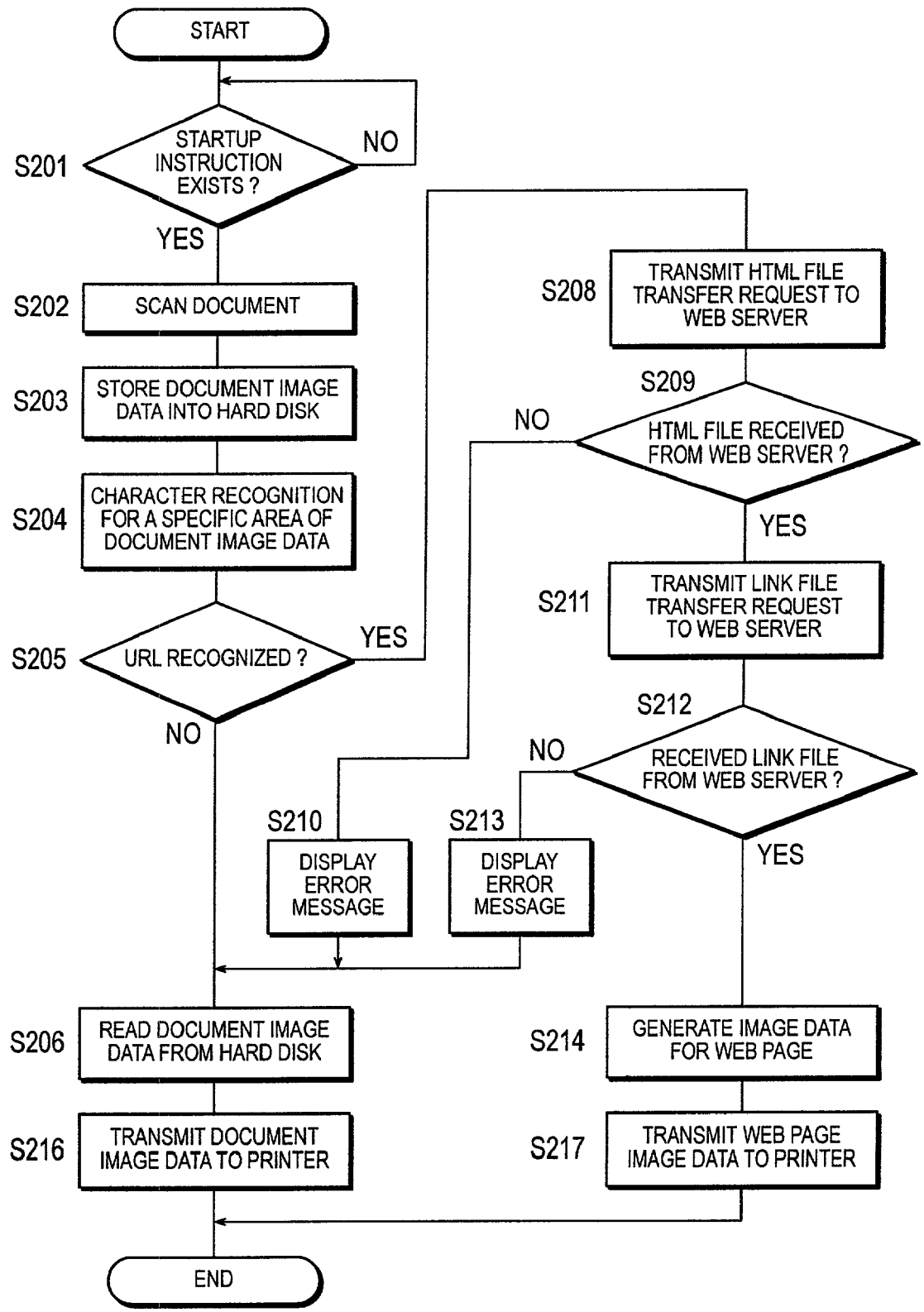
FIG. 10 is a flowchart showing the steps of image processing for the scanner 12.

FIG. 10 is a flowchart showing the image processing steps of the scanner 12 according to this embodiment. The image processing steps of the scanner 12 in this embodiment are different from those of the image processing steps of the digital copying machine 11 of the first embodiment in that the document image data stored in the hard disk 124 in the step S203 is readout to the RAM 113 (S206), and the document image data is transmitted to other equipment such as a printer via the local interface 127 or the network interface 128 (S216), when the URL is not recognized in the character recognition process in the step S104 (S205: No), the HTML file is not received from the Web server in the step of HTML file transfer request transmission in the step S208 (S209: No), and the link file is not received from the Web server in the step of link file transfer request transmission in the step S211 (S212: No). Moreover, if the URL is recognized (S205: Yes), the HTML file is received (S209: Yes), and the link file is received (S212: Yes) in the above-mentioned steps, the scanner 12 generates a Web page image data based on the received HTML file and link file (S214), and transmits the Web page image data to other equipment such as a printer via the local interface 127 or the network interface 128 (S217).

Figure 11:
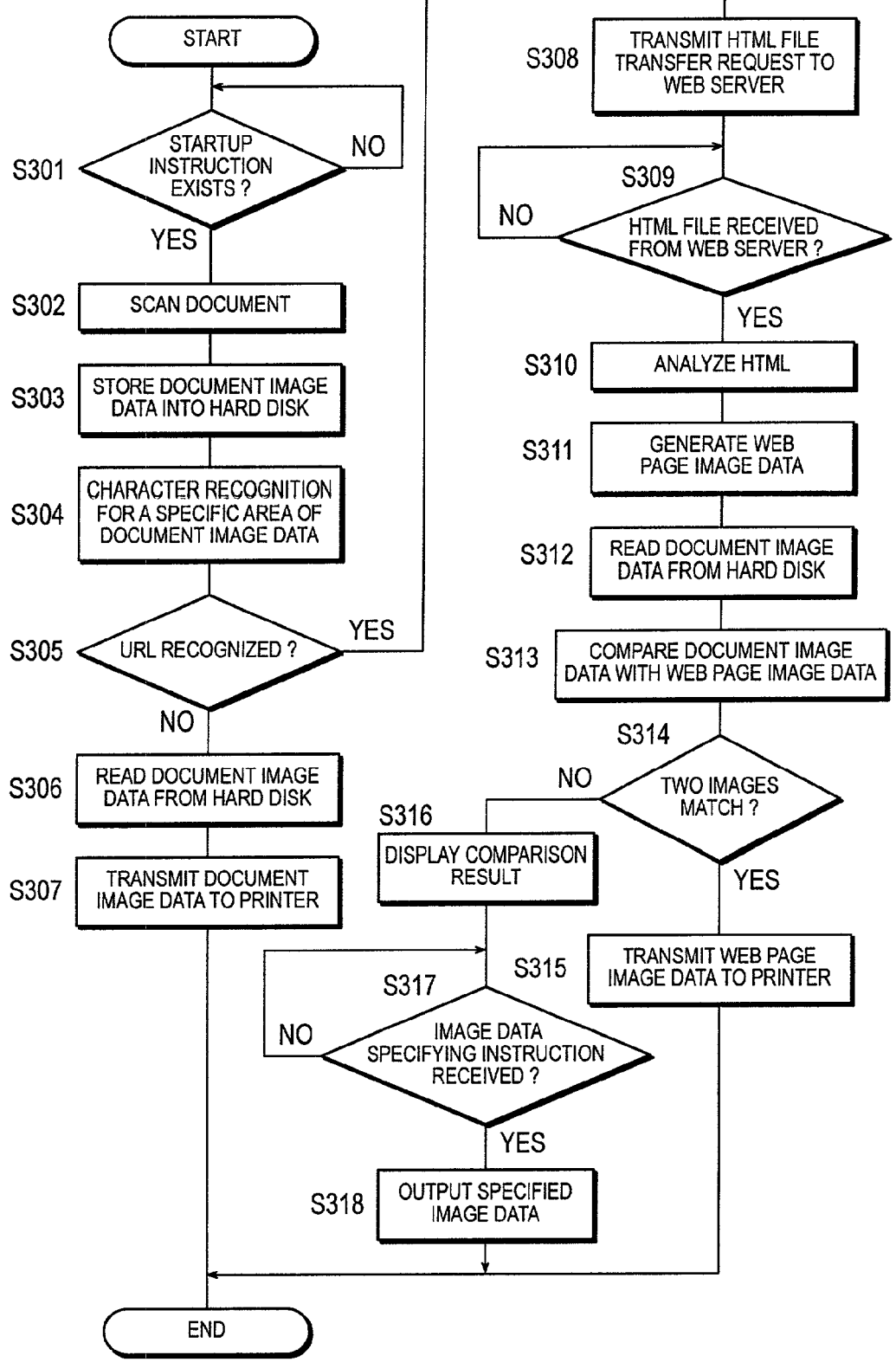
FIG. 11 is a flowchart showing the steps of image processing for the scanner according to the third embodiment.

FIG. 11 is a flowchart showing the steps of image processing for the scanner according to the third embodiment of the present invention. The scanner according to this embodiment has a constitution similar to that of the scanner 12 according to the second embodiment, and is connected to the Web server 20 via the communication network 30 and to a printer 40 via a local interface respectively same as in the case of the scanner 12. In FIG. 11, the scanner stands by until it receives the user's startup instruction (S301). The user sets a document, on which a Web page is printed, to a specified position of the document table, sets up necessary copying conditions from the operating panel 125 and presses the startup key.

Upon receiving the startup instruction from the user (S301: Yes), the scanner obtains the image data by scanning the document (S302), and stores the obtained document image data to the hard disk 124 (S303).

Next, the character recognition process is performed on the specified area of the document image data (S304). If said character recognition process fails to recognize the URL (S305: No), the document image data stored in the hard disk 114 in the step S303 is read out to the RAM 213 (S306), and the document image data is transmitted to other equipment such as the printer 40 via a local interface 217 or a network interface 218 (S307).

On the other hand, if said character recognition process recognizes the URL (S305: Yes), the HTML file transfer request is transmitted to the Web server 20 specified by the recognized URL via the network interface 218 and the communication network 30 (S308). Next, it stands by until it receives the HTML file from the Web server 20 (S309: No). When it receives the HTML file from the Web server 20 via the communication network 30 and the network interface 218 (S309: Yes), it analyzes the received HTML file (S310), transmits the link file transfer request to the Web server 20, and generates the Web page image data as it receives the link file (S311).

Next, the document image data stored in the hard disk 214 is read out to the RAM 113 (S312) and the document image data is compared with the obtained Web page image data. This is done so because the generated Web page image may be different from the document image due to updating of the Web page, revision or misrecognition of the URL, etc. Such a discrepancy is detected by comparing the obtained Web page image data with the document image data, and a notification for the user of such a discrepancy is displayed urging the user to instruct which image data is to be output.

The comparison of the Web page image data with the document image data can be performed by analyzing the layout of each image data, extracting each area, converting them to a uniform size by a normalization process, determining points at which the sum of the subtraction of the gradation values (or RGB histograms) between the corresponding pixels of the two data by means of a pattern matching process is minimum, calculating the ratio of the pixels whose subtraction values at said points are less than a threshold value, and making a judgment that the two images match with each other if said ratio is greater than a certain specified value (a value empirically determined) or that the two images do not match if said ratio is less than said specified value.

If it is judged that the two images match with each other as a result of the comparison of the document image data with the Web page image data (S314: Yes), the Web page image data is transmitted to other equipment such as the printer 40 via the local interface 217 or the network interface 218 (S315). This makes it possible to use the original image data of the Web page with less image quality deterioration compared to the document image data for the rest of the image processing.

On the other hand, if it is judged that the two images do not match with each other as a result of the comparison of the document image data with the Web page image data (S314: No), a message screen 64 notifying that the two image data do not match with each other is displayed on an operating panel unit 215 as shown in FIG. 12 (S316), and it stands by until the user enters an instruction specifying the image data to be outputted (S317: No). The user enters an instruction whether the document image data or the Web page image data to be outputted by pressing a virtual button on the message screen 64. When it receives from the user the input that specifies the image data to be outputted (S317: Yes), the scanner transmits the image data specified by the user to other equipment such as the printer 40 vial the local interface 217 or the network interface 218 (S318).

Figure 13:
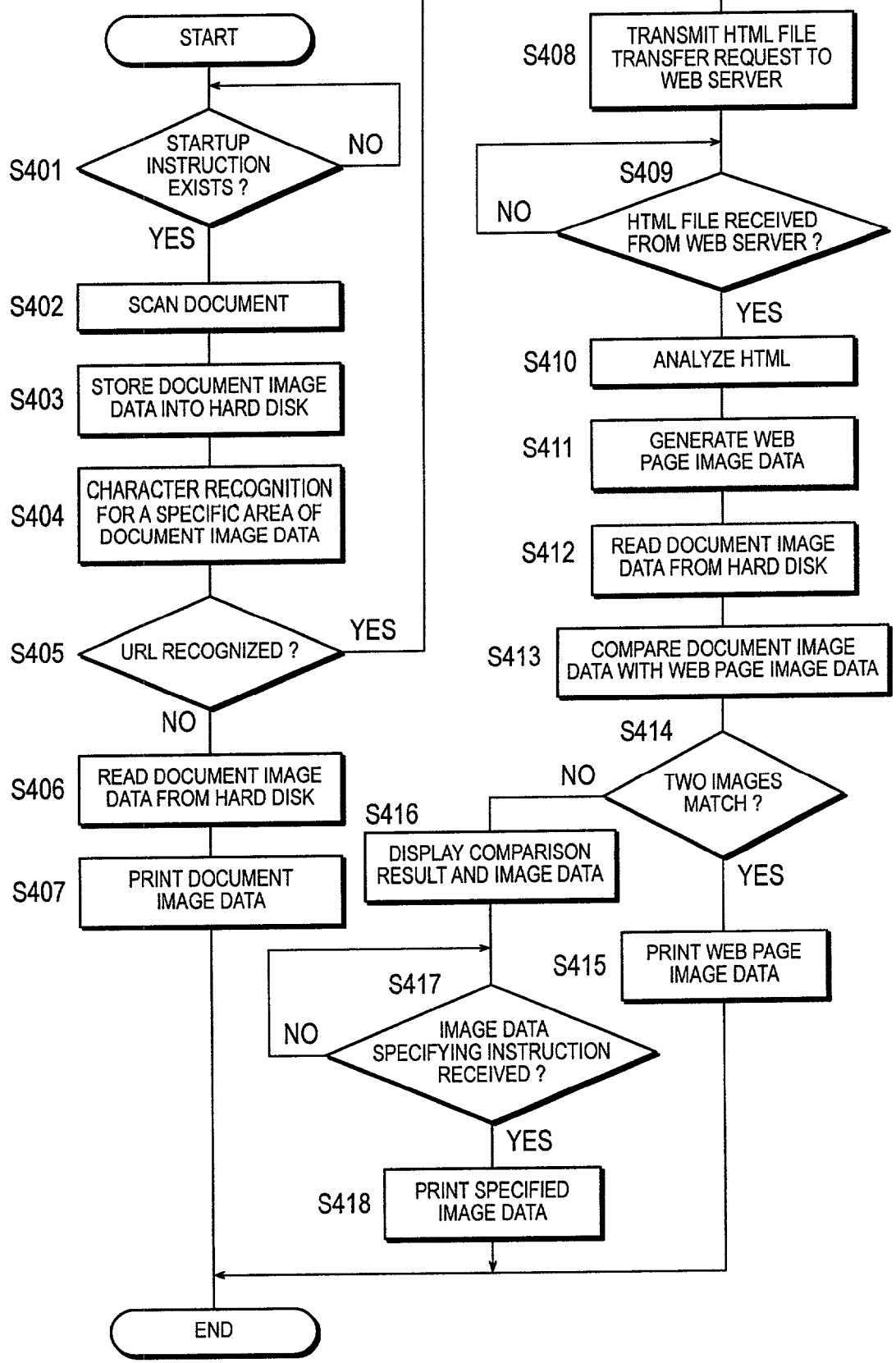
FIG. 13 is a flowchart showing the steps of image processing for the digital copying machine according to the fourth embodiment of the present invention.
Figure 14:
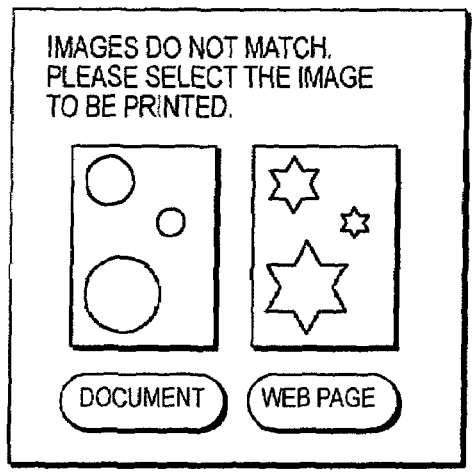
FIG. 14 is a diagram showing an example error message screen to be displayed on the operating panel unit 115 of the digital copying machine according to the fourth embodiment when the document image fails to match with the Web page image.
Figure 15:
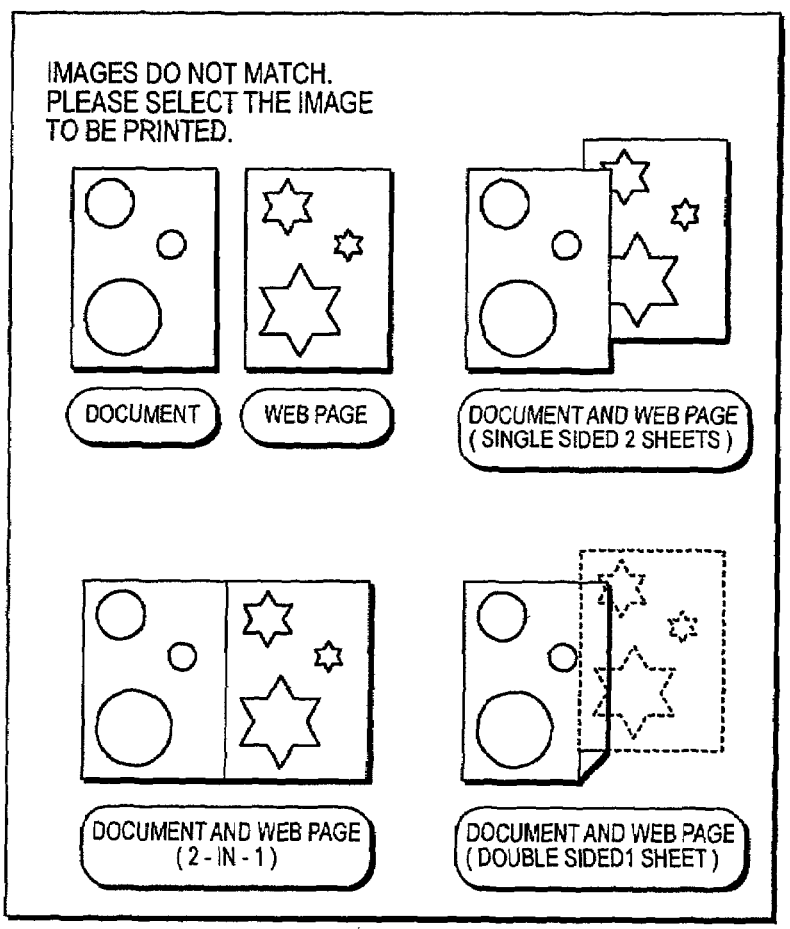
FIG. 15 is a diagram showing another example error message screen to be displayed on the operating panel unit 115 of the digital copying machine according to the fourth embodiment when the document image fails to match with the Web page image.

FIG. 13 is a flowchart showing the steps of image processing for a digital copying machine, an image-processing device according to the fourth embodiment of the present invention. The digital copying machine according to this embodiment has an identical constitution as that of the digital copying machine 11 according to the first embodiment, and is connected to the Web server 20 via the communication network 30 similar to the digital copying machine 11. The steps of the digital copying machine according to this embodiment are different from the steps of the scammer according to the third embodiment in: that, if the URL fails to be recognized in the character recognition process after the document image data is scanned and stored in the hard disk, it reads out the document image data from the hard disk 124 and prints it out (S401 through S406 and S407); that, if the URL is recognized, it compares the document image data with the generated Web page data after generating the Web image data, and prints the Web image data if the two images match (S405: Yes through S414: Yes, and S415); and that, if the two images do not match, it prints the image data specified by the instruction input (S414: No through S417: Yes, and S418). The difference is also in that, if the two images do not match in the comparison between the document image data and the Web page data, it displays not only a message that there is a mismatch between the two images, but also the document image data and the Web image data in order to allow the user to enter an instruction for the output image as a screen 65 shown in FIG. 14 (S416 and S417). This enables the user to specify the output image by actually comparing the document image data and the Web image data. It is also possible to constitute in this case in such a way as to display a message screen 66 as shown in FIG. 15 in order to allow the user to print both the document image data and the Web page image data. It is also possible to constitute in such a way as to allow the user to specify as the printing method either the two single sided sheets, 2-in-1 (a method of arranging the two pages of image on a single page output data), or double sided printing method. It goes without saying that such a display is applicable to the scanner according to the third embodiment.

Figure 16:
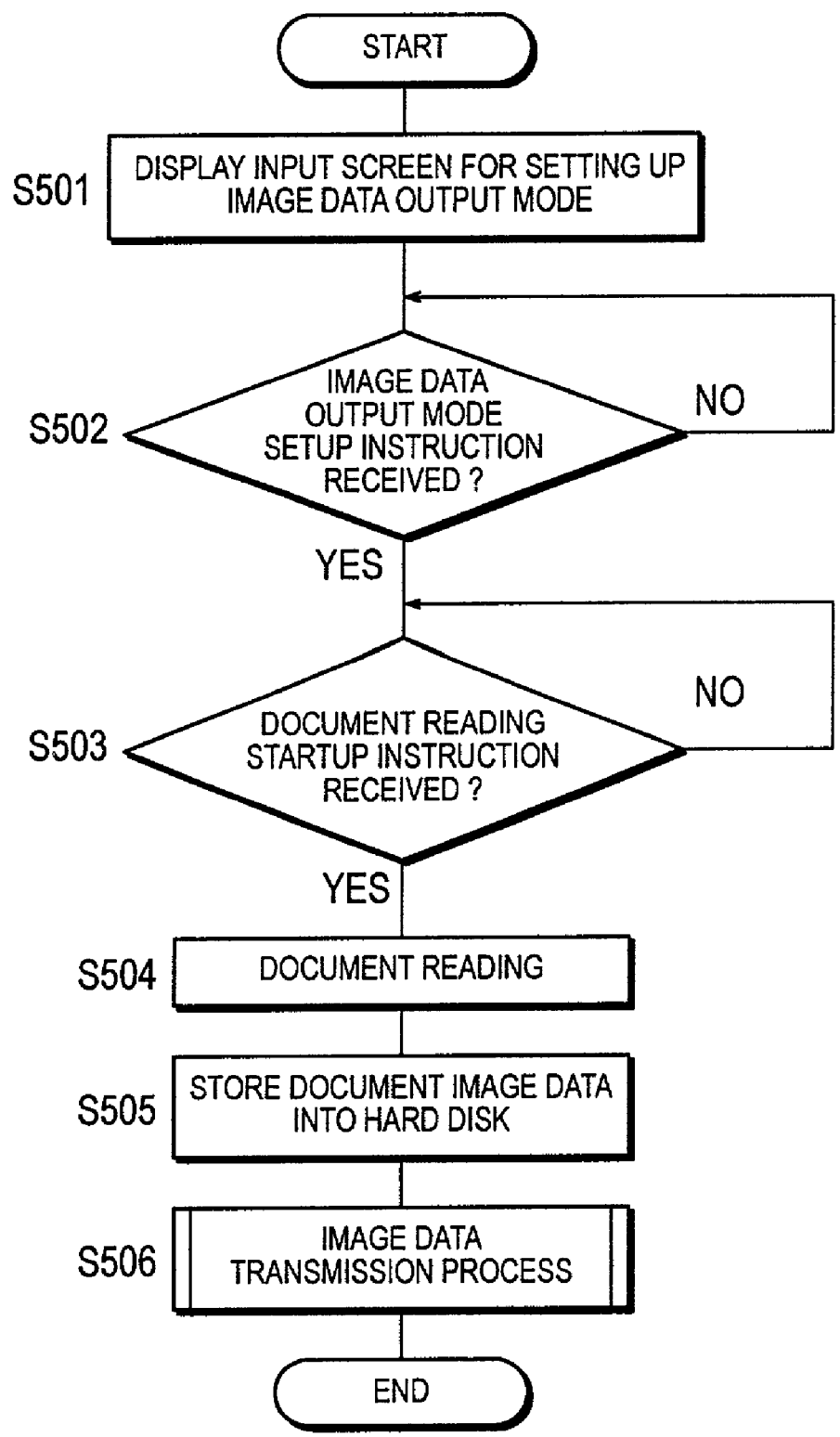
FIG. 16 is a flowchart showing the steps of image processing for the scanner according to the fifth embodiment.

FIG. 16 is a flowchart showing the steps of image processing for the scanner 15, an image-processing device according to the fifth embodiment. The scanner 15 has an identical constitution as that of the scanner 12 according to the second embodiment. It is connected to the Web server 20 via the communication network 30, and to the printer 40 via a local interface similar to the scanner 12. In FIG. 16, the scanner 15 displays the input screen for setting up the image data output mode on the touch panel of the operating panel unit 115 (S501), and stands by until the user enters the input for setting up the image data output mode (S502: No).

FIG. 17 is a diagram showing an example input screen for setting up the image data output mode to be displayed the touch panel of the operating panel unit 125 of the scanner of the fifth embodiment. The scanner according to this embodiment has four kinds of image data output mode, i.e., the "Document Image" mode, "Latest Image" mode, "Image Quality Prioritizing" mode, and "Speed Prioritizing" mode. With reference to a document, which is a printout of a Web page, the document image data itself is outputted as is in the "Document Image" mode, and the Web page image data based on the latest HTML file downloaded from the Web server 20 is outputted in the "Latest Image" mode. In the "Image Quality Prioritizing" mode, it naturally outputs the Web page image data obtained from the HTML file, if the HTML file already exists, having been downloaded from the Web page and stored in the hard disk; or the Web page image data obtained from the HTML file newly downloaded from the Web page, if the corresponding HTML file does not exist, thus prioritizing the image quality by means of outputting the image data having a better image quality than the document image data, using the image data obtained from the HTML file. In the "Speed Prioritizing" mode, it outputs the Web page image data obtained from the HTML file, if the HTML file already exists, having been downloaded from the Web page and stored in the hard disk; or the document image data, if the corresponding HTML file does not exist, thus prioritizing the speed by avoiding any new downloading of the HTML file from the Web page. In FIG. 17, the setup screen 67 for setting up the image data output mode includes virtual buttons for allowing the user to select the image data output modes, so that the user can set up the desired image data output mode by pressing these buttons.

Upon receiving the user's setup input for the image data output mode (S502: Yes), the scanner 15 stands by until it receives the user's image scanning startup order (S503: No). The user sets a document, on which a Web page is printed, to a specified position of the document table, sets up other necessary copying conditions from the operating panel 125 and presses the startup key pf the operating panel 125. Upon receiving the startup instruction from the user (S503: Yes), the scanner 15 obtains the image data by scanning the document (S504), and stores the obtained document image data to the hard disk 124 (S505). Next, the image data transmission process is executed in accordance with the image data output mode received as the user's setup input in the step S102 (S506).

Figures 18, 18A:
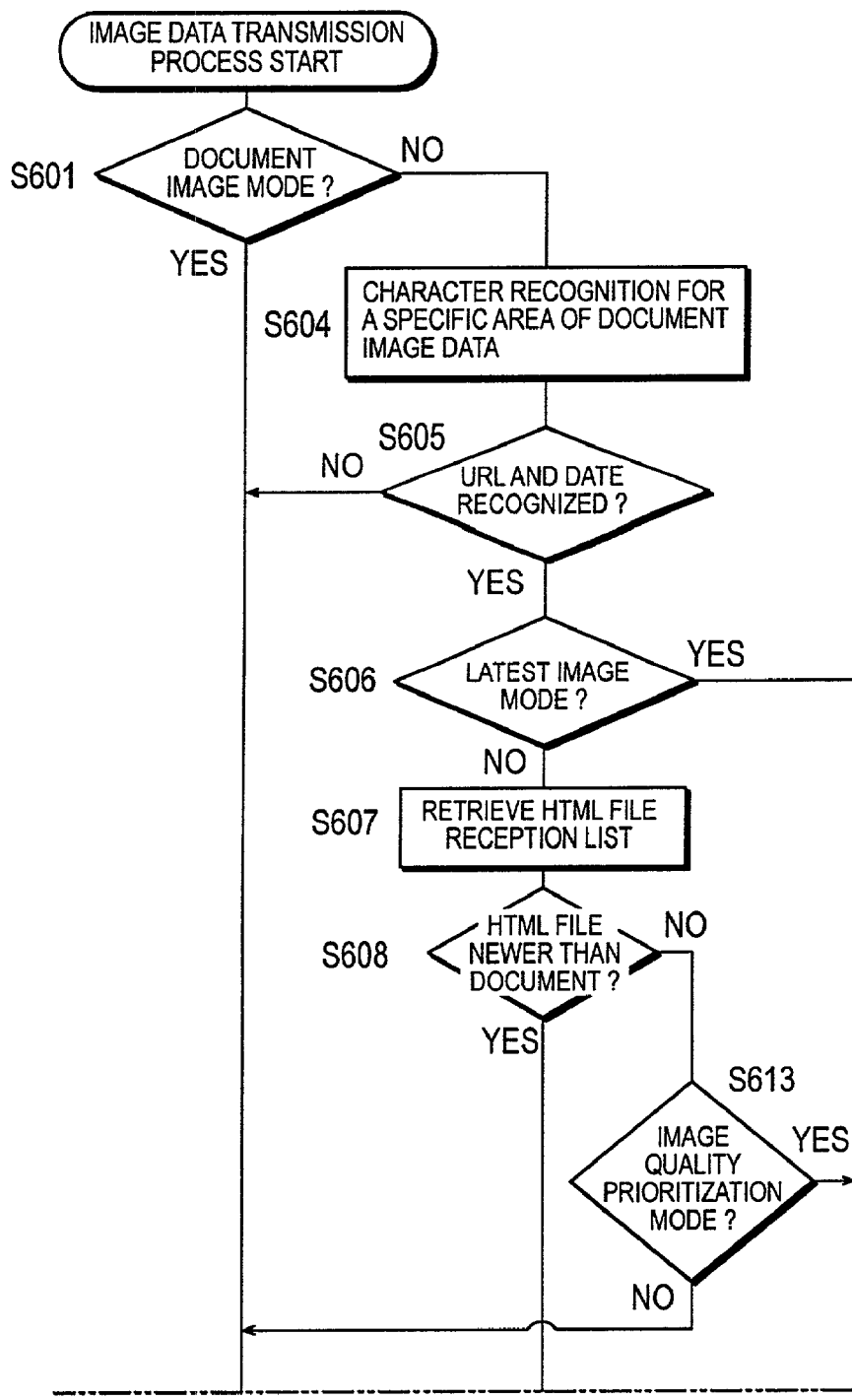
FIG. 18 is a flowchart showing the steps of image data transmission processing for the scanner according to the fifth embodiment.
Figure 18B:
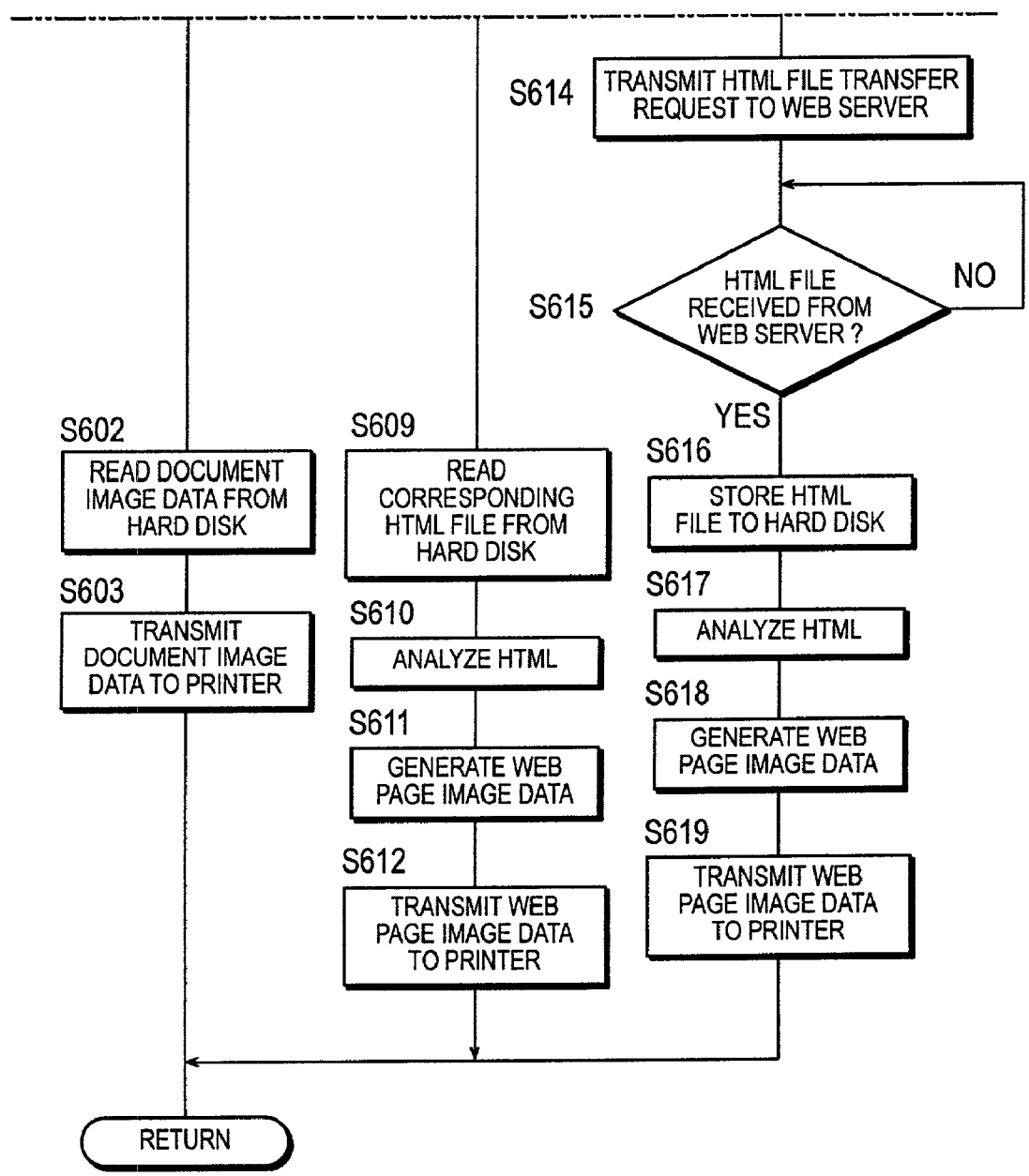

FIG. 18 is a flowchart showing the steps of image data transmission processing for the scanner according to the fifth embodiment. In FIG. 18, if the image data output mode instructed by the user is the "Document Image" mode (S601: Yes), the scanner reads out the document image data stored in the hard disk 124 to the RAM 123 (S602), and transmits the document image data to other equipment such as the printer 40 (S603) via the local interface 127 or the network interface 128. This makes it possible to output a document image data in the "Document Image" mode, which is preferable as it can reproduce a document identical to the original with some additional information, e.g., handwritten notes.

On the other hand, if the image data output mode instructed by the user is the "Image Quality Prioritizing" mode (S601: No, S606: No, and S613: Yes), the character recognition process is executed in the specified area of the document image data (S604). As shown in FIG. 4, a certain area of the document 51, for example, the header or the footer, contains not only the URL 512 of the Web page but also the printing data 513 when said Web page was printed, so that it is possible to recognize the URL and the printing data by applying the character recognition process to these areas.

If it fails to recognize the URL and the printing date by means of said character recognition process (S605: No), it reads the document image data from the hard disk 124 (S602) similar to the steps of the "Document Image" mode, and transmits the document image data to external equipment such as the printer 40 (S603).

If it succeeds to recognize the URL and the printing date by means of said character recognition process (S605: Yes), it reads the HTML file reception list stored in the hard disk 124 to the RAM 123 and retrieves the HTML that is an HTML file related to said URL and is received later than said printing date, i.e., an HTML file newer than the document, from the HTML file reception list (S607). FIG. 19 is an example HTML file reception list for the scanner. The HTML file reception list 71 stores the file name, the URL, the storage directory of the hard disk, and the reception date of the HTML file the scanner received from the Web server on the communication network 30. If the HTML file newer than the document is detected from the HTML file list (S608: Yes), it reads out the corresponding HTML file to the RAM 123 from the hard disk 124 according to the storage directory of the HTML file reception list (S609). Next, the obtained HTML file is analyzed (S610), and further reads out the link file from the hard disk 124 to generate the image data of the Web page (S611). The generated Web page image data is transmitted to other equipment such as the printer 40 via the local interface 127 or the network interface 128 (S612).

On the other hand, if it fails to detect a new HTML file newer than the document from the HTML file reception list (S608: No), the scanner transmits the HTML file transfer request to the Web page server 20 related to the Web page specified by the URL recognized in the character recognition step (S604) via the network interface 128 and the communication network 30 (S614). Next, it stands by until it receives the HTML file from the Web server 20 (S615: No). When it receives the HTML file from the Web server 20 via the communication network 30 and the network interface 128 (S615: Yes), it stores the received HTML file in the specified directory of the hard disk 124 (S616), and updates the HTML file reception list. Next, it analyzes the received HTML file (S617), transmits a link file transfer request to the Web server 20, receives the link file, and generates the image data of the Web page (S618). It transmits the generated Web page image data to other equipment such as the printer 40 via the local interface 127 or the network interface 128 (S619).

Thus, according to the "Image Quality Prioritizing" mode, while image data with good image qualities are outputted by means of always using image data obtained from HTML files, the output speed can also be improved by means of using an HTML file, if such an HTML file has been downloaded from the Web page and is already stored in the hard disk.

If the image data output mode instructed by the user is the "Speed Prioritizing" mode (S601: No, S606: No, and S613: No), the character recognition process is executed in the specified area of the document image data (S604) same as in steps of the S604 through S612 of the "Image Quality Prioritizing" mode and, if it succeeds in recognizing the URL and the printing date (S605: Yes), it retrieves a HTML file newer than the document based on the URL and the printing date recognized from the HTML file reception list (S607). If a HTML file newer than the document is detected from the HTML reception list (S608: Yes), it reads out the corresponding HTML file from the hard disk 124 (S609), analyzes the HTML file (S610), generates the Web page image data (S611), and transmits it to other equipment such as the printer 40 (S612).

On the other hand, if it fails to detect a HTML file newer than the document from the HTML file reception list (S608: No), it reads the document image data from the hard disk 124 (S602) similar to the steps of the "Document Image" mode, and transmits the document image data to external equipment such as the printer 40 (S603).

Thus, according to the "Speed Prioritizing" mode, while prioritizing the output speed by avoiding downloading of HTML files from Web pages, the image quality can also be improved by means of using an HTML file, if such an HTML file has been downloaded from the Web page and is already stored in the hard disk.

If the image data output mode instructed by the user is the "Latest Image" mode (S601: No and S606: yes), it transmits the HTML file transfer request to the Web server 20 related to the Web page specified by the URL (S614) same as in the steps S614 through S619 of the "Image Quality Prioritizing" mode. Upon receiving the HTML file from the Web server 20 (S615: Yes), it stores the received HTML file to the specified directory of the hard disk 124 (S616), and updates the HTML file reception list. It analyzes the received HTML file (S617), generates the Web page image data (S618), and transmits to other equipment such as the printer 40 (S619). Thus, in the "Latest Image" mode, Web page image data are always outputted using HTML files newly downloaded from Web pages, it is possible to output Web page printouts based on the latest Web page images.

Although the present embodiment was described in the above using a scanner as an example of the image-processing device, the image-processing device is not limited to the scanner but can be any multiple function peripheral equipment (MFP), for example, a digital copying machine having an image scanning function and an image forming function. In such a case, in the steps (S603, S612 and S619) of transmitting the image data to said external equipment, images can be first formed from said image data and then output instead of transmitting the image data to external equipment such as a printer.

Figure 20:
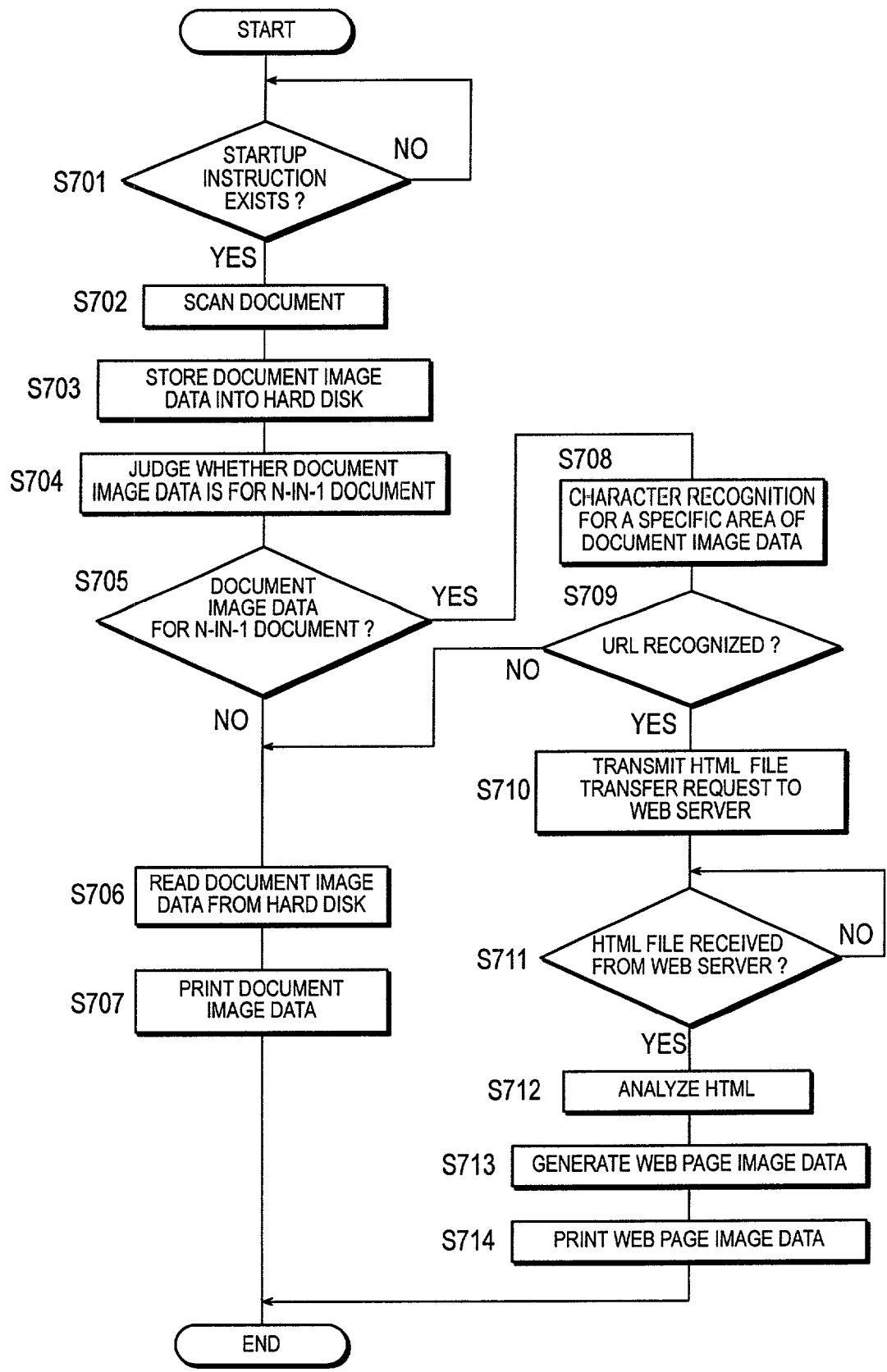
FIG. 20 is a flowchart showing the steps of image processing for the digital copying machine according to the sixth embodiment.

FIG. 20 is a flowchart showing the steps of image processing for the digital copying machine according to the sixth embodiment. The digital copying machine according to this embodiment has an identical constitution as the digital copying machine 11 according to the first embodiment and is connected to the Web server 20 via the communication network 30. In FIG. 20, the digital copying machine first stands by until it receives a startup instruction for document scanning from the user (S701: No). The user sets a document, on which a Web page is printed, to a specified position of the document table, sets up other necessary copying conditions from the operating panel 115 and presses the startup key. Upon receiving the startup instruction from the user (S701: Yes), the digital copying machine obtains the image data by scanning the document (S702), and stores the obtained document image data to the hard disk 124 (S703).

Figure 21:
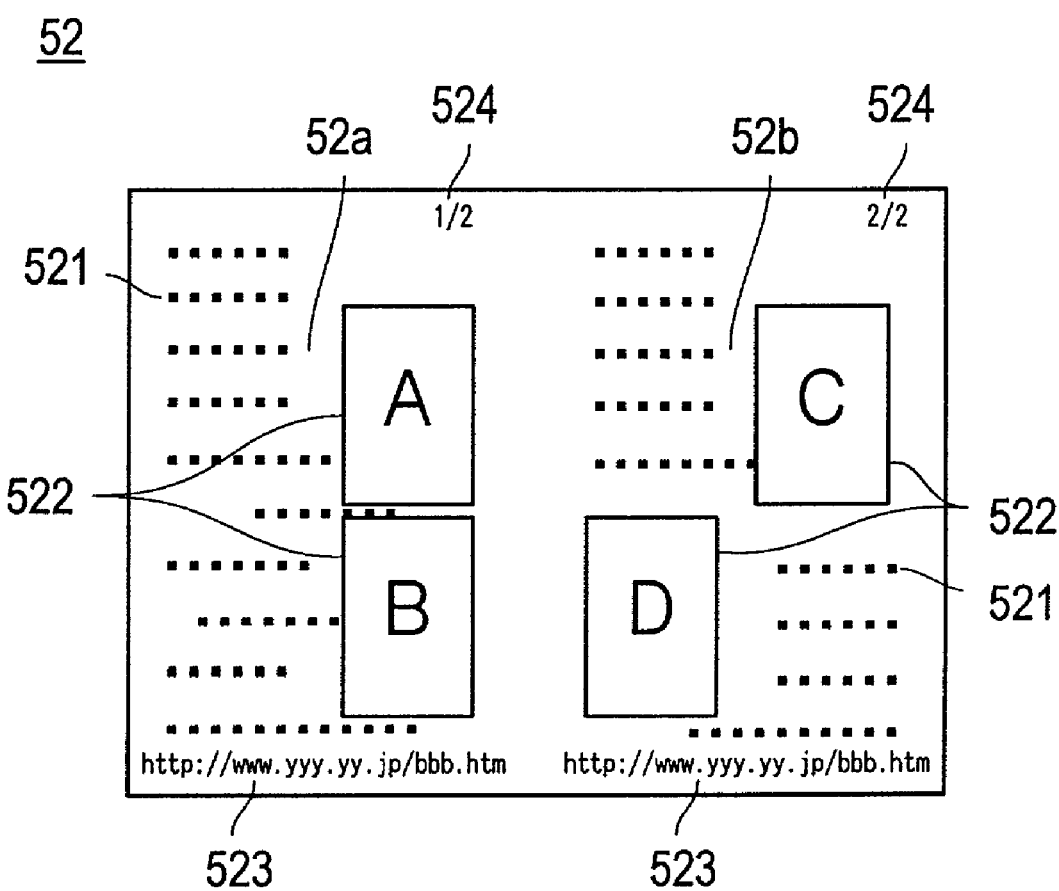
FIG. 21 is a diagram showing an example document produced by printing Web pages in the N-in-1 (2-in-1) mode.
Figure 22:
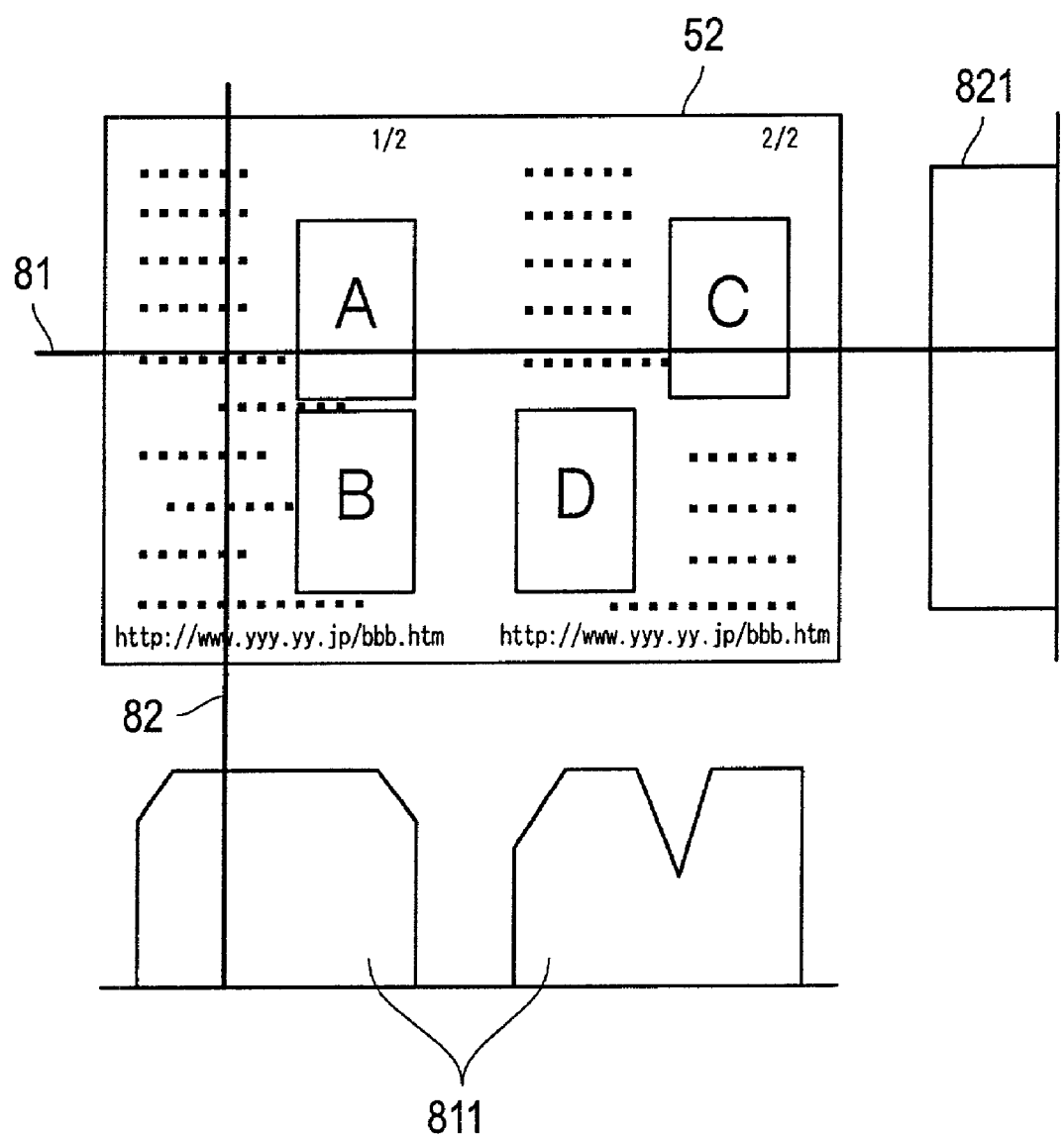
FIG. 22 is a diagram exemplifying the method of judging whether the document image data is according to the N-in-1 document.

Next, it makes a judgment whether the obtained document image data is of an N-in-1 document, i.e., a reduced image document obtained by printing an image data of multiple pages of HTML file for Web pages (image data that would produce multiple printed pages if printed under normal conditions under the equal scaling) reduced to fit into a single page (S704). FIG. 21 is a diagram showing an example document produced by printing HTML files for Web pages in the N-in-1 (2-in-1) mode. In FIG. 21, a document 52 is an image of Web pages consisting of text portions 521 and graphics or photographs 522, wherein images 52a and 52b, which would produce two pages if the HTML files corresponding to said Web pages were to be printed normally in the equal scaling, are printed in a reduced size to fit into a single sheet of printing. The judgment of whether the scanned document image data is of a N-in-1 document can be made by counting the number of blocks sectored by blank spaces by detecting blank spaces of the image as the N value of the N-in-1 document image. In other words, the blank spaces are detected from a histogram 821 obtained by integrating the number of pixels for each long side direction line 81 of the document image and a histogram 811 obtained by integrating the number of pixels for each short side direction line 82 as shown in FIG. 22, and a judgment is made whether it is an N-in-1 document image based on the number of blocks N determined from the detected blank spaces. In case of FIG. 22, a judgment is made that the image data of the document 52 consists of two blocks as the histogram 811 has one blank space (i.e., the histogram is divided into two), so that it is a 2-in-1 document image. In addition, it is also possible to use a method of applying a character recognition process to the scanned document image, data and judging that it is an N-in-1 document if multiple (N) URL or page numbers are recognized, as multiple (N) URL 523 or page numbers 524 are displayed as shown in FIG. 21 in case of an N-in-1 document.

Unless the obtained document image data is of an N-in-1 document (S705: No), the digital copying machine reads out the document image data stored in the hard disk 114 to the RAM 113 (S706), and prints it out after applying to it necessary image processing corresponding to the setup conditions, etc., (S707).

On the other hand, if the obtained document image data is of an N-in-1 document (S705: Yes), it applies character recognition process to a specified area of the document image data (S708), reads out the document image data from the hard disk 114 (S706) if no URL is recognized as a result of said character recognition process (S709: No), and prints out the document image data (S707). If an URL is recognized as a result of said character recognition process (S709: Yes), a HTML file transfer request is transmitted (S710) to the Web server 20 corresponding to the Web page indicated by said URL via the network interface 118 and the communication network 30. Next, it stands by until it receives an HTML file from the Web server 20 (S711: No). Upon receiving an HTML file from the Web sever 20 via the communication Network 30 and the network interface 118 (S711: Yes), it analyzes the received HTML file (S712), transmits a link file transfer request to the Web server 20, generates a Web page image data (S713) upon receiving a link file, and prints the generated Web page image data after applying to it necessary image process corresponding to setup conditions, etc., (S714).

Thus it is capable of automatically identifying whether a document image data is of an N-in-1 document and outputting a Web page image of high quality void of scratchy fine lines and character smearing that often occur in N-in-1 document copies, even if it is of an N-in-1 document, by using Web page image data based on downloaded HTML files.

Although the present embodiment was described in the above using a digital copying machine as an example of the image-processing device, the image-processing device is not limited to it but can be any multiple function peripheral equipment (MFP), for example, a facsimile machine having an image scanning function and an image forming function. Moreover, the image-scanning device of this embodiment can be a scanner as well and, in printing said image data in such a case, the image data printing processes (S707 and S714) can be replaced with the process of transmitting the image data to external equipment such as a printer.

Figure 23:
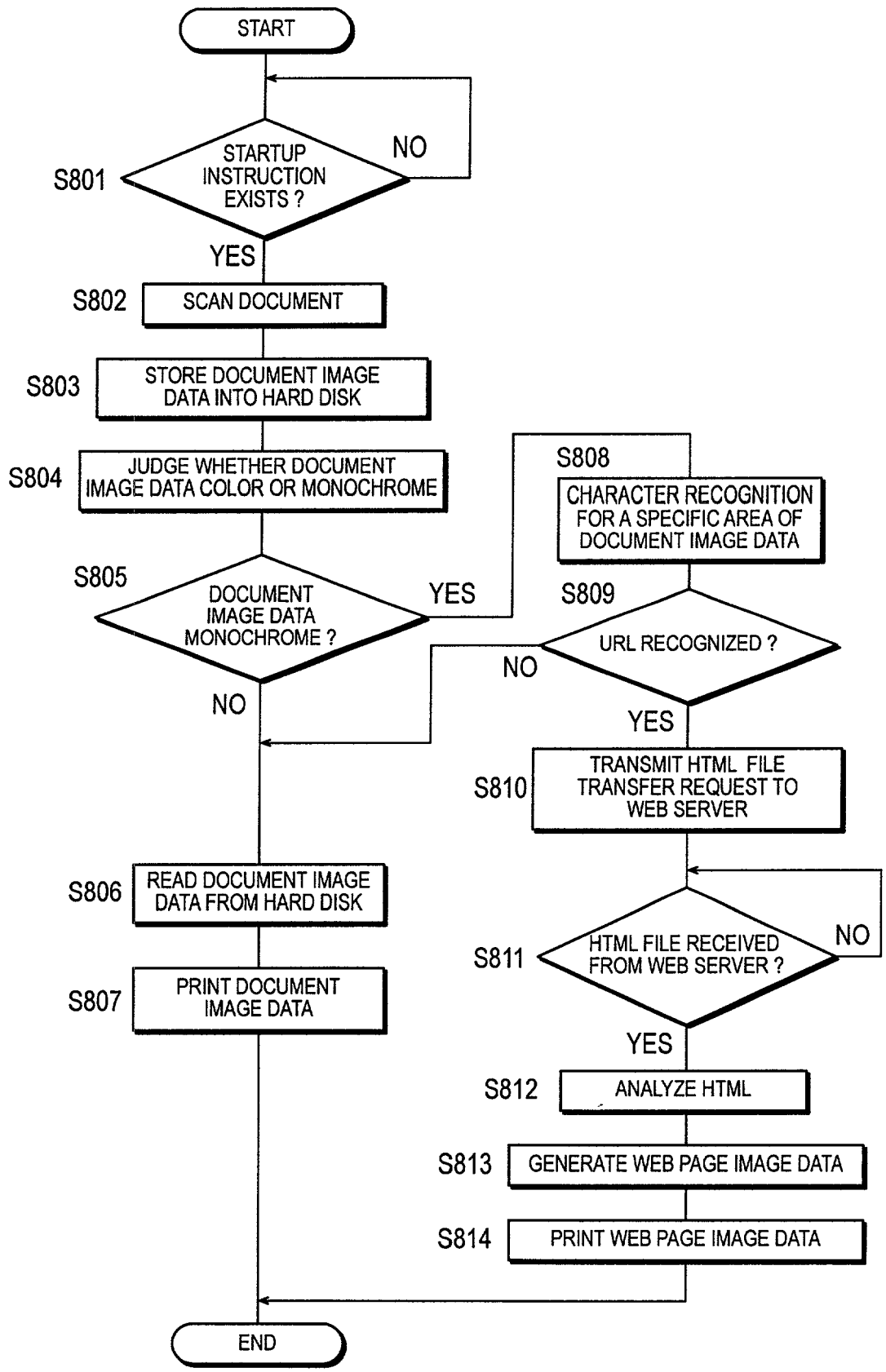
FIG. 23 is a flowchart showing the steps of image processing for the digital copying machine according to the seventh embodiment of the present invention.

FIG. 23 is a flowchart showing the steps of image processing for the digital copying machine according to the seventh embodiment. The digital copying machine according to this embodiment has an identical constitution as the digital copying machine 11 according to the first embodiment. Incidentally, a printing unit 117 in the digital copying machine is capable of color printing. Moreover, it is connected to the Web server 20 via the communication network 30 same as in the case of the digital copying machine 11. In FIG. 23, the digital copying machine first stands by until it receives a startup instruction for document scanning from the user (S801: No). Upon receiving the startup instruction from the user (S801: Yes), it obtains the image data by scanning the document (S802), and stores the obtained document image data to the hard disk 114 (S803).

Next, a judgment is made as to whether the obtained document image is a color or monochromatic image (S804). The judgment whether the document image data is color or monochromatic can be made by calculating the brightness histogram of the entire pixels of the image data and the brightness histogram of achromatic image pixels of the image data, obtaining the ratio of the pixels in the color areas against the entire pixels in the image data, and determining whether it is color or monochromatic based on whether said ratio is above or below a standard value.

If the obtained document image data is in color (S805: No), the digital copying machine reads out the document image data stored in the hard disk 114 to the RAM 113 (S806) and prints the obtained document image data (S807).

On the other hand, if the obtained document image data is monochromatic (S805: Yes), it executes the character recognition process in the specified area of the document image data (S808), reads the document image data from the hard disk 114 (S806) if no URL is recognized as a result of the character recognition (S809: No), and prints the document image (S807). If an URL is recognized as a result of the character recognition (S809: Yes), it transmits the HTML file transfer request (S810) to the Web server 20 corresponding to the Web page indicated by said URL. Next, it stands by until it receives an HTML file from the Web server 20 (S811: No). Upon receiving an HTML file from the Web sever 20 via the communication Network 30 and the network interface 118 (S811: Yes), it analyzes the received HTML file (S812), generates a Web page image data (S813), and prints the generated Web page image data (S814). Thus it is capable of automatically identifying whether a document is in color or monochromatic and outputting a Web page image in color, even if the document is monochromatic, by using a downloaded Web page image data on a digital copying machine capable of printing in color.

Figure 24:
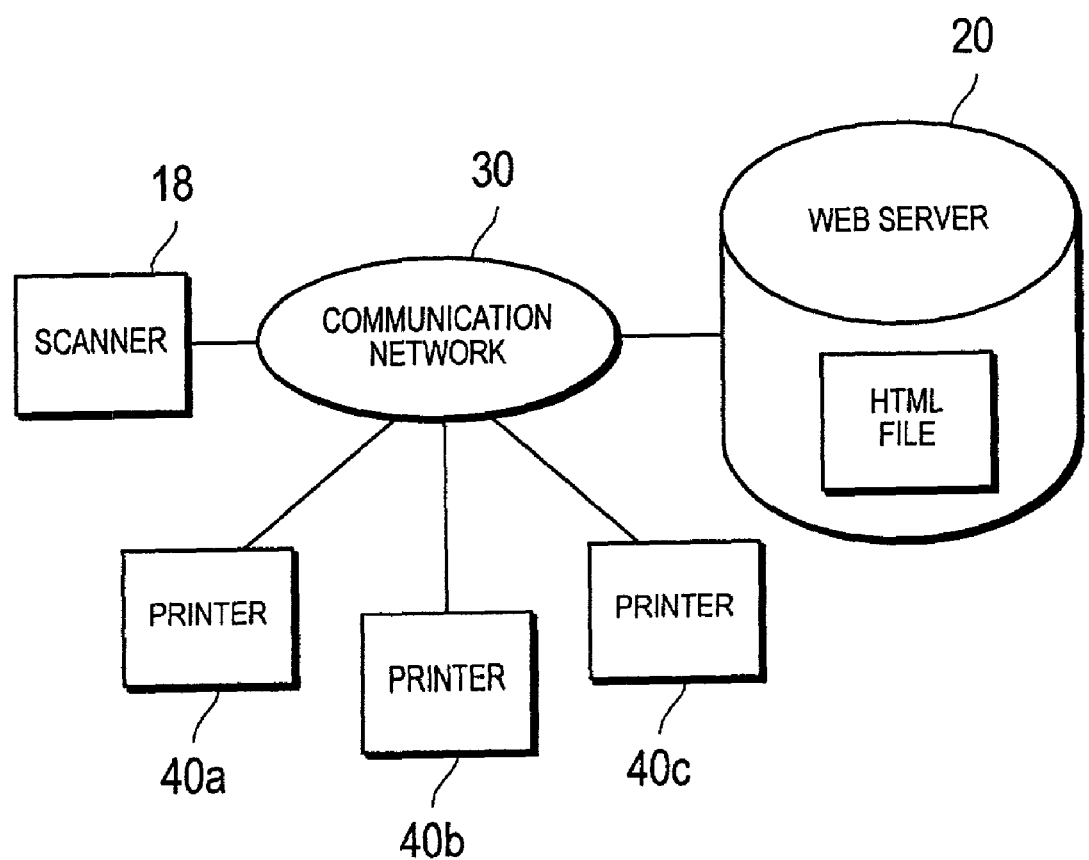
FIG. 24 is a block diagram showing the entire constitution of the image processing system including the scanner 18 according to the eighth embodiment of the present invention.

FIG. 24 is a block diagram showing the entire constitution of the image processing system including an image-processing device according to the eighth embodiment of the present invention. The image processing system consists of a scanner 18, the image-processing device of the embodiment, and the Web server 20 connected via the communication network 30. The scanner 18 is connected with printers 40a, 40b and 40c via the communication network 30. The scanner 18 according to this embodiment has a constitution identical to that of the scanner 12 of the second embodiment. However, it does not necessarily have to have the local interface 127.

Figure 25:
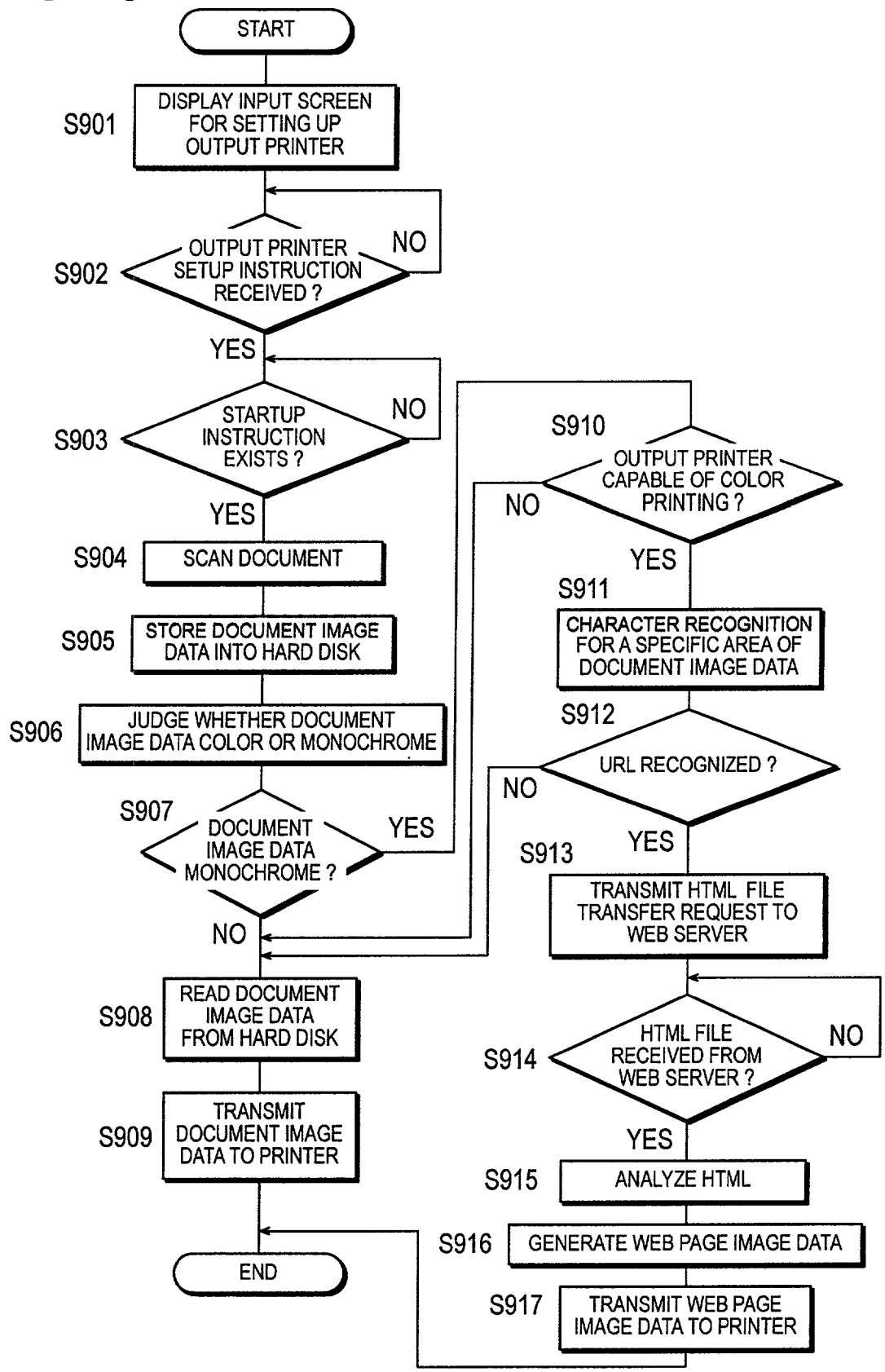
FIG. 25 is a flowchart showing the steps of image processing for the scanner 18.

FIG. 25 is a flowchart showing the steps of image processing for the scanner 18. The steps of image processing for the scanner 18 according to this embodiment are different from those for the digital copying machine according to the seventh embodiment in: that, in prior to scanning the document, it displays on the touch panel of the operating panel unit 125 the setup input screen to allow the user to select and set up the printer for outputting the image data (S901) and accepts the setup input for the output printer from the user (S902); and that it transmits the document image data to the output printer (S908 and S909), which is set up by the input reception step for the output printer (S901 and S902), if the document image data is judged to be colored (S907: No) in the monochromatic/color identification step (S906), while, if the document image data is judged to be monochromatic (S907: Yes), it transmits the document image data to said printer (S908 and S909) if said output printer is capable of monochromatic printing only (S910: No), or transmits the Web page image data obtained from the Web server corresponding to the recognized URL (S911 through S917) if said output printer is capable of printing in color (S910: Yes). Thus it is capable of outputting suitable image data depending on whether the output device is capable of color output or monochromatic output only and, in case the output device is capable of outputting in color, automatically identifying whether the document is in color or monochromatic in order to output in color even if the document is monochromatic by using the downloaded Web page image data for a monochromatic document.

The judgment of whether the specified output printer is capable of printing in color or printing only monochromatically can be made by communicating with said printer when the output printer is selected at the step S902 to receive the status information of said printer and making a judgment based on the status information; or by obtaining the status information of various equipment including the printer connected to the communication network 30 beforehand, storing it as a status information table in the RAM 113, etc., and making a decision using it.

Although the printer is identified as the destination of the image data transmission in the descriptions of the second, third, fifth and eighth embodiments, the destination of the document image data output is not limited to a printer, but can be any multiple function peripheral equipment capable of forming images such as a digital copying machine and a facsimile machine, or an image display device such as a display unit, or an image process device such as a personal computer.

Although the Web server is identified as the file server connected to the communication network 30 in the descriptions of each embodiment in the above, said file server is not limited to it; nor the document file laid open in public is limited to the HTML file.

The document image-processing device according to this invention is applicable to any multiple function peripheral (MFP) equipment capable of scanning image such as a facsimile machine in addition to the digital copying machine and scanner mentioned in the description of various embodiments in the above.

Various steps and image processing methods according to the present invention can be materialized either by means of a dedicated hardware circuit or a programmed image-processing device. In case of materializing the present invention by the programmed image-processing device, the program with which to operate the image-processing device can be provided by means of computer-readable recording media such as floppy disks and CD-ROMS. In such a case, the program stored in the computer-readable recording media is normally transferred to and recorded on a ROM, hard disk, etc. Such a program can be either provided as a standalone piece of application software or can be built into an image-processing device as a part of its functions.

As described in the above, the image processing devices according to this invention are capable of automatically outputting document image data even if they encounter difficulties in connection to the Web server due to misrecognition of URLS, relocations or deletions of Web pages, or congestions or interruptions of Web servers, when they read printed Web pages, recognize the character their URLS, generate the image data of the Web pages by connecting to the Web servers and output them.

Moreover, the image processing devices according to the present invention allow the user to select and output desired images when images of Web pages different from the document images due to updated Web pages, revised URLs, or misrecognized URLS.

Further, the image processing devices according to the present invention are capable of output printouts of Web pages in conformance with the user's preference, such as image quality prioritization or speed prioritization, by selectively outputting as needed either document image data, already downloaded Web page document data, or newly downloaded Web page document data.

Further more, the image processing devices according to the present invention are capable of outputting high quality Web page images void of smeared characters, etc., by means of making a judgment on whether the particular image is an N-in-1 document and using a downloaded Web page image data if it is an N-in-1 document.

Further more, the image processing devices according to the present invention are capable of outputting in color, if the output device is capable of outputting in color, by making a judgment whether a document is in color or monochromatic, and using downloaded Web page image data even in case of a monochromatic document.

What is claimed is:

1. A data processing device connected to a server computer via a network comprising:

an image reader for obtaining an image data by reading a document image, wherein the document is printed based on a file published on the network by the server computer;

first extracting means for extracting location information that indicates the location of the file from the first image data; a second extracting means for extracting printing date that indicates the date when the document was printed from the first image data; a receiving means for receiving a file transferred by the server computer;

a storage device for storing the file received by the receiving means;

file retrieving means for retrieving a file that has the same location information as the location information extracted from the first image data and was received later than the printing date extracted from the first image data;

data generating means for generating a second image data based on the file retrieved by the file retrieving means;

transfer requesting means for requesting the server computer to transfer the file based on the location information extracted by the first extracting means;

second data generating means for generating a third image data based on the file transferred by the server computer in accordance with the transfer request by the transfer requesting means;

a printer for printing images based on image data; and transmitting means for transmitting the second image data to the printer if the file retrieving means succeeds in retrieving the file, and transmitting the third image data to the printer if the file retrieving means fails in retrieving the file.

2. A data processing device connected to a server computer via a network comprising:

an image reader for obtaining a first image data by reading a document image, wherein the document is printed based on a file published on the network by the server computer;

first extracting means for extracting location information that indicates the location of the file from the first image data; a second extracting means for extracting printing date that indicates the date when the document was printed from the first image data; a receiving means for receiving a file transferred by the server computer;

a storage device for storing the file received by the receiving means;

file retrieving means for retrieving a file that has the same location information as the location information extracted from the first image data and was received later than the printing date extracted from the first image data;

data generating means for generating a second image data based on the file retrieved by the file retrieving means;

transfer requesting means for requesting the server computer to transfer the file based on the location information extracted by the first extracting means;

second data generating means for generating a third image data based on the file transferred by the server computer in accordance with the transfer request by the transfer requesting means; and transmitting means for transmitting the second image data to another device if the file retrieving means succeeds in retrieving the file, and transmitting the third image data to the another device if the file retrieving means fails in retrieving the file.

3. A data processing device according to claim 1, wherein the first and second extracting means extract the location information and printing date respectively by applying a character recognition process to character images existing in a certain area of the first image data.

4. A data processing device according to claim 1, wherein the location information is a URL.

5. A data processing device connected to a server computer via a network comprising: an image reader for obtaining a first image data by reading a document image, wherein the document is printed based on a file published on the network by the server computer; a first extracting means for extracting location information that indicates the location of the file from the first image data; a second extracting means for extracting printing date that indicates the date when the document was printed from the first image data; a receiving means for receiving a file transferred by the server computer; a storage device for storing the file received by the receiving means; a file retrieving means for retrieving a file that has the same location information as the location information extracted from the first image data and was received later than the printing date extracted from the first image data; a transfer requesting means for requesting the server computer to transfer the file based on the location information extracted by the first extracting means; a mode receiving means for receiving an instruction specifying either an image quality prioritizing mode or a speed prioritizing mode; a data generating means for generating a second image data based on the file retrieved by the file retrieving means and further generating a third image data based on the file transferred by the server computer in accordance with the file transfer request by the transfer requesting means; a first transmitting means for transmitting, in the image quality prioritizing mode, the second image data to a specific destination if the file retrieval means succeeds in retrieving the file, while transmitting the third image data to the specific destination if the file retrieval means fails to retrieve the file; and a second transmitting means for transmitting, in the speed prioritizing mode, the second image data to the specific destination if the file retrieval means succeeds in retrieving the file, while transmitting the first image data to the specific destination if the file retrieval means fails to retrieve the file.

6. A data processing method according to claim 5, further comprising: a printer for printing images based on image data, wherein the specific destination is the printer.

7. A data processing method according to claim 5, wherein the specific destination is another device.

8. A data processing method according to claim 5, wherein the first and second extracting means extract the location information and printing date respectively by applying a character recognition process to character images existing in a certain area of the first image data.

9. A data processing method according to claim 5, wherein the location information is a URL.

10. A data processing device connected to a server computer via a network comprising: an image reader for obtaining a first image data by reading a document image, wherein the document is printed based on a file published on the network by the server computer; an extracting means for extracting location information that indicates the location of the file from the first image data; a transfer requesting means for requesting the server computer to transfer the file based on the location information extracted by the first extracting means; a receiving means for receiving a file transferred by the server computer; a data generating means for generating a second image data based on the file received by the receiving means; a judging means for judging whether the document image is an image consisting of reduced multiple pages based on the first image data; and a transmitting means for transmitting the second image data to a specific destination if it is judged by the judging means that the document image is the image consisting of reduced multiple pages, while transmitting the first image data to the specific destination if it is judged that the document image is not the image consisting of reduced multiple pages.

11. A data processing device according to claim 10, further comprising: a printer for printing images based on image data, wherein the specific destination is the printer.

12. A data processing device according to claim 10, wherein the specific destination is another device.

13. A data processing device according to claim 10, wherein the extracting means extracts the location information by applying a character recognition process to character images existing in a certain area of the first image data.

14. A data processing device according to claim 10, wherein the location information is a URL.

15. A data processing device connected to a server computer via a network comprising: an image reader for obtaining a first image data by reading a document image, wherein the document is printed based on a file published on the network by the server computer; an extracting means for extracting location information that indicates the location of the file from the first image data; a transfer requesting means for requesting the server computer to transfer the file based on the location information extracted by the first extracting means; a receiving means for receiving a file transferred by the server computer; a data generating means for generating a second image data based on the file received by the receiving means; a judging means for judging whether the document image is a color or monochromatic image based on the first image data; and a transmitting means for transmitting the first image data to a specific destination if it is judged by the judging means that the document image is a color image, while transmitting the second image data to the specific destination if it is judged that the document image is a monochromatic image.

16. A data processing device according to claim 15, further comprising: a printer for printing images based on image data, wherein the specific destination is the printer.

17. A data processing device according to claim 15, wherein the specific destination is another device.

18. A data processing device according to claim 15, wherein the extracting means extract the location information by applying a character recognition process to character images existing in a certain area of the first image data.

19. A data processing device according to claim 15, wherein the location information is a URL.

20. A data processing device connected to a server computer via a network comprising:
   an image reader for obtaining a first image data by reading a document image, wherein the document is printed based on a file published on the network by the server computer;
   a first extracting unit for extracting location information that indicates the location of the file from the first image data;
   a second extracting unit for extracting printing date that indicates the date when the document was printed from the first image data;

a receiving unit for receiving a file transferred by the server computer;

a storage device for storing the file received by the receiving unit;

a file retrieving unit for retrieving a file that has the same location information as the location information extracted from the first image data and was received later than the printing date extracted from the first image data;

a data generating unit for generating a second image data based on the file retrieved by the file retrieving unit;

a transfer requesting unit for requesting the server computer to transfer the file based on the location information extracted by the first extracting unit;

a second data generating unit for generating a third image data based on the file transferred by the server computer in accordance with the transfer request by the transfer requesting unit;

a printer for printing images based on image data; and a transmitting unit for transmitting the second image data to the printer if the file retrieving unit succeeds in retrieving the file, and transmitting the third image data to the printer if the file retrieving unit fails in retrieving the file.

21. A data processing device connected to a server computer via a network comprising:

an image reader for obtaining a first image data by reading a document image, wherein the document is printed based on a file published on the network by the server computer;

a first extracting unit for extracting location information that indicates the location of the file from the first image data;

a second extracting unit for extracting printing date that indicates the date when the document was printed from the first image data;

a receiving unit for receiving a file transferred by the server computer;

a storage device for storing the file received by the receiving unit;

a file retrieving unit for retrieving a file that has the same location information as the location information extracted from the first image data and was received later than the printing date extracted from the first image data;

a data generating unit for generating a second image data based on the file retrieved by the file retrieving unit;

a transfer requesting unit for requesting the server computer to transfer the file based on the location information extracted by the first extracting unit;

a second data generating unit for generating a third image data based on the file transferred by the server computer in accordance with the transfer request by the transfer requesting unit; and a transmitting unit for transmitting the second image data to another device if the file retrieving unit succeeds in retrieving the file, and transmitting the third image data to the another device if the file retrieving unit fails in retrieving the file.

22. A data processing device according to claim 20, wherein the first and second extracting units extract the location information and printing date respectively by applying a character recognition process to character images existing in a certain area of the first image data.

23. A data processing device according to claim 20, wherein the location information is a URL.

24. A data processing device connected to a server computer via a network comprising:

an image reader for obtaining a first image data by reading a document image, wherein the document is printed based on a file published on the network by the server computer;

a first extracting unit for extracting location information that indicates the location of the file from the first image data;

a second extracting unit for extracting printing date that indicates the date when the document was printed from the first image data;

a receiving unit for receiving a file transferred by the server computer;

a storage device for storing the file received by the receiving unit;

a file retrieving unit for retrieving a file that has the same location information as the location information extracted from the first image data and was received later than the printing date extracted from the first image data;

a transfer requesting unit for requesting the server computer to transfer the file based on the location information extracted by the first extracting unit;

a mode receiving unit for receiving an instruction specifying either an image quality prioritizing mode or a speed prioritizing mode;

a data generating unit for generating a second image data based on the file retrieved by the file retrieving unit and further generating a third image data based on the file transferred by the server computer in accordance with the file transfer request by the transfer requesting unit;

a first transmitting unit for transmitting, in the image quality prioritizing mode, the second image data to a specific destination if the file retrieval unit succeeds in retrieving the file, while transmitting the third image data to the specific destination if the file retrieval unit fails to retrieve the file; and a second transmitting unit for transmitting, in the speed prioritizing mode, the second image data to the specific destination if the file retrieval unit succeeds in retrieving the file, while transmitting the first image data to the specific destination if the file retrieval unit fails to retrieve the file.

25. A data processing device according to claim 24, further comprising: a printer for printing images based on image data, wherein the specific destination is the printer.

26. A data processing device according to claim 24, wherein the specific destination is another device.

27. A data processing device according to claim 24, wherein the first and second extracting units extract the location information and printing date respectively by applying a character recognition process to character images existing in a certain area of the first image data.

28. A data processing device according to claim 24, wherein the location information is a URL.

29. A data processing device connected to a server computer via a network comprising:

an image reader for obtaining a first image data by reading a document image, wherein the document is printed based on a file published on the network by the server computer;

an extracting unit for extracting location information that indicates the location of the file from the first image data;

a transfer requesting unit for requesting the server computer to transfer the file based on the location information extracted by the first extracting unit;

a receiving unit for receiving a file transferred by the server computer;

a data generating unit for generating a second image data based on the file received by the receiving unit;

a judging unit for judging whether the document image is an image consisting of reduced multiple pages based on the first image data; and a transmitting unit for transmitting the second image data to a specific destination if it is judged by the judging unit that the document image is the image consisting of reduced multiple pages, while transmitting the first image data to the specific destination if it is judged that the document image is not the image consisting of reduced multiple pages.

30. A data processing device according to claim 29, further comprising: a printer for printing images based on image data, wherein the specific destination is the printer.

31. A data processing device according to claim 29, wherein the specific destination is another device.

32. A data processing device according to claim 29, wherein the extracting unit extracts the location information by applying a character recognition process to character images existing in a certain area of the first image data.

33. A data processing device according to claim 29, wherein the location information is a URL.

34. A data processing device connected to a server computer via a network comprising:

an image reader for obtaining a first image data by reading a document image, wherein the document is printed based on a file published on the network by the server computer;

an extracting unit for extracting location information that indicates the location of the file from the first image data;

a transfer requesting unit for requesting the server computer to transfer the file based on the location information extracted by the first extracting unit;

a receiving unit for receiving a file transferred by the server computer;

a data generating unit for generating a second image data based on the file received by the receiving unit;

a judging unit for judging whether the document image is a color or monochromatic image based on the first image data; and a transmitting unit for transmitting the first image data to a specific destination if it is judged by the judging unit that the document image is a color image, while transmitting the second image data to the specific destination if it is judged that the document image is a monochromatic image.

35. A data processing device according to claim 34, further comprising: a printer for printing images based on image data, wherein the specific destination is the printer.

36. A data processing device according to claim 34, wherein the specific destination is another device.

37. A data processing device according to claim 34, wherein the extracting unit extracts the location information by applying a character recognition process to character images existing in a certain area of the first image data.

38. A data processing device according to claim 34, wherein the location information is a URL.

* * * * *